US012500384B2

(12) United States Patent
Luo et al.

(10) Patent No.: US 12,500,384 B2
(45) Date of Patent: Dec. 16, 2025

(54) ELECTRICAL CONNECTOR WITH MULTIPLE SHIELDING SPACERS BETWEEN TWO ROWS OF TERMINALS

(71) Applicant: Dongguan Kangxiang Electronic Co., Ltd., Dongguan (CN)

(72) Inventors: Ming Luo, Dongguan (CN); Yung-Chang Lin, Dongguan (CN); Yu-Hung Lin, Dongguan (CN); Hung-Tien Chang, Dongguan (CN); Hsuan Ho Chung, Dongguan (CN)

(73) Assignee: Dongguan Kangxiang Electronic Co., Ltd., Dongguan (CN)

( * ) Notice: Subject to any disclaimer, the term of this patent is extended or adjusted under 35 U.S.C. 154(b) by 266 days.

(21) Appl. No.: 18/324,975

(22) Filed: May 27, 2023

(65) Prior Publication Data

US 2024/0170896 A1 May 23, 2024

(51) Int. Cl.
*H01R 13/6587* (2011.01)
*H01R 12/55* (2011.01)
(Continued)

(52) U.S. Cl.
CPC ......... *H01R 13/6587* (2013.01); *H01R 12/55* (2013.01); *H01R 12/57* (2013.01); *H01R 12/58* (2013.01); *H01R 12/707* (2013.01); *H01R 12/716* (2013.01); *H01R 13/02* (2013.01); *H01R 13/40* (2013.01); *H01R 13/6581* (2013.01); *H01R 4/029* (2013.01); *H01R 12/72* (2013.01); *H01R 12/722* (2013.01); *H01R 12/725* (2013.01); *H01R 12/727* (2013.01); *H01R 13/6461* (2013.01); *H01R 13/6467* (2013.01); *H01R 13/6471* (2013.01); *H01R 13/6474* (2013.01); *H01R 13/648* (2013.01);
(Continued)

(58) Field of Classification Search
CPC .... H01R 13/6587; H01R 12/55; H01R 12/57; H01R 12/58; H01R 12/707; H01R 12/716; H01R 13/02; H01R 13/40; H01R 13/6581; H01R 4/029; H01R 12/72; H01R 12/722; H01R 12/725; H01R 12/727; H01R 13/6461; H01R 13/6467; H01R 13/6471; H01R 13/6474; H01R 13/648; H01R 13/658; H01R 13/6585; H01R 13/6586; H01R 13/6595; H01R 24/64
See application file for complete search history.

(56) References Cited

FOREIGN PATENT DOCUMENTS

| | | | | |
|---|---|---|---|---|
| CN | 106856284 A | * | 6/2017 | H01R 13/648 |
| CN | 107465015 A | * | 12/2017 | H01R 13/02 |

* cited by examiner

*Primary Examiner* — Justin M Kratt
(74) *Attorney, Agent, or Firm* — Roger Chen

(57) ABSTRACT

A composite mounting type electrical connector includes an insulating shell, a plurality of terminals and a plurality of shielding members. The terminals are arranged in two rows parallel to each other, and the shielding members are arranged between the two rows of terminals and separated from each other by a predetermined distance to form insulation. The two rows of terminals are soldered to a circuit board by surface mounting technology and dual in line package process respectively. The ground terminals in the two columns of terminals are commonly connected to a shield member to form a common ground structure. The power terminals in the two columns of terminals are commonly connected to another shielding member to form a parallel connecting structure.

9 Claims, 21 Drawing Sheets

(51) Int. Cl.

| | |
|---|---|
| ***H01R 12/57*** | (2011.01) |
| ***H01R 12/58*** | (2011.01) |
| ***H01R 12/70*** | (2011.01) |
| ***H01R 12/71*** | (2011.01) |
| ***H01R 13/02*** | (2006.01) |
| ***H01R 13/40*** | (2006.01) |
| ***H01R 13/6581*** | (2011.01) |
| *H01R 4/02* | (2006.01) |
| *H01R 12/72* | (2011.01) |
| *H01R 13/6461* | (2011.01) |
| *H01R 13/6467* | (2011.01) |
| *H01R 13/6471* | (2011.01) |
| *H01R 13/6474* | (2011.01) |
| *H01R 13/648* | (2006.01) |
| *H01R 13/658* | (2011.01) |
| *H01R 13/6585* | (2011.01) |
| *H01R 13/6586* | (2011.01) |
| *H01R 13/6595* | (2011.01) |
| *H01R 24/64* | (2011.01) |

(52) U.S. Cl.

CPC ........ *H01R 13/658* (2013.01); *H01R 13/6585* (2013.01); *H01R 13/6586* (2013.01); *H01R 13/6595* (2013.01); *H01R 24/64* (2013.01)

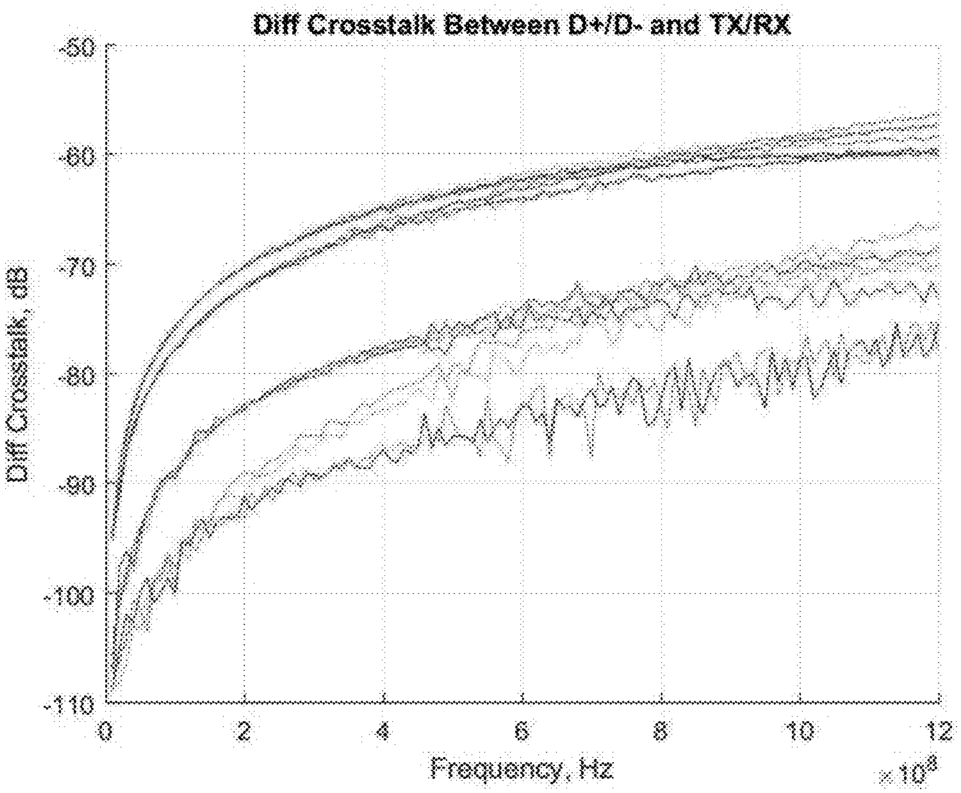

FIG. 35

| | Tx1 | Rx1 | Tx2 | Rx2 | Limit | Min Margin | | | | |
|---|---|---|---|---|---|---|---|---|---|---|
| IL@@2.5GHz, dB | -0.29 | -0.32 | -0.21 | -0.25 | -0.6 | 0.27 | | | | |
| IL@@5GHz, dB | -0.53 | -0.5 | -0.29 | -0.33 | -0.8 | 0.27 | | | | |
| IL@@10GHz, dB | -0.46 | -0.45 | -0.42 | -0.47 | -1 | 0.53 | | | | |
| IL@@12.5GHz, dB | -0.52 | -0.5 | -0.5 | -0.52 | -1.25 | 0.73 | | | | |
| IL@@15GHz, dB | -0.58 | -0.6 | -0.56 | -0.58 | -1.5 | 0.9 | | | | |
| IMR, dB | -43.97 | -46.48 | -47.76 | -43.51 | -39 | 4.51 | | | | |
| IRL, dB | -17.84 | -18.97 | -19.56 | -17.21 | -15 | 2.21 | | | | |
| C2D, dB | -26.16 | -26.04 | -29.8 | -27.4 | -20 | 7.4 | | | | |
| IXC, dB | -28.15 | -30.08 | -28.74 | -27.39 | -20 | 7.39 | | | | |
| | | | | | | | | | | |
| Tx1 | NEXT(1,2) | NEXT(1,7) | NEXT(2,5) | NEXT(2,8) | Limit | Min Margin | | | | |
| | -47.08 | -53.25 | -46.93 | -53.57 | -43 | 3.93 | | | | |
| Rx1 | NEXT(1,1) | NEXT(2,5) | NEXT(1,2) | NEXT(4,8) | Limit | Min Margin | | | | |
| | -47.86 | -51.06 | -46.93 | -53 | -43 | 3.93 | | | | |
| Tx2 | NEXT(5,1) | NEXT(5,7) | NEXT(6,4) | NEXT(6,8) | Limit | Min Margin | | | | |
| | -51.08 | -47.16 | -54 | -46.93 | -43 | 3.93 | | | | |
| Rx2 | NEXT(8,1) | NEXT(7,5) | NEXT(8,2) | NEXT(8,6) | Limit | Min Margin | | | | |
| | -54.18 | -47.16 | -53.57 | -46.93 | -43 | 3.93 | | | | |
| | | | | | | | | | | |
| Tx1 | FEXT(1,4) | FEXT(1,6) | FEXT(1,8) | FEXT(2,3) | FEXT(2,5) | FEXT(2,7) | Limit | Min Margin | | |
| | -45.52 | -57.68 | -50.65 | -44.45 | -54.6 | -54.73 | -43 | 1.45 | | |
| Rx1 | FEXT(3,2) | FEXT(3,6) | FEXT(3,8) | FEXT(4,1) | FEXT(4,5) | FEXT(4,7) | Limit | Min Margin | | |
| | -44.48 | -52.29 | -54.73 | -45.62 | -52.87 | -57.88 | -43 | 1.48 | | |
| Tx2 | FEXT(5,2) | FEXT(5,4) | FEXT(5,8) | FEXT(6,1) | FEXT(6,3) | FEXT(6,7) | Limit | Min Margin | | |
| | -54.5 | -62.87 | -44.36 | -57.65 | -52.59 | -45.09 | -43 | 1.36 | | |
| Rx2 | FEXT(7,2) | FEXT(7,4) | FEXT(7,6) | FEXT(8,1) | FEXT(8,3) | FEXT(8,5) | Limit | Min Margin | | |
| | -54.74 | -57.68 | -45.86 | -54.63 | -54.73 | -44.36 | -43 | 1.36 | | |
| | | | | | | | | | | |
| | Tx1 | Rx1 | Tx2 | Rx2 | Limit | Min Margin | | | | |
| TX/RX to D+/D- NEXT, dB | -61.26 | -70.05 | -70.12 | -61.35 | -50 | 11.26 | | | | |
| TX/RX to D+/D- FEXT, dB | -62.28 | -71.69 | -71.46 | -62.29 | -50 | 12.28 | | | | |
| | Tx1(D+) | Tx1(D-) | Rx1(D+) | Rx1(D-) | Tx2(D+) | Tx2(D-) | Rx2(D+) | Rx2(D-) | Limit | Min Margin |
| D+/D- to TX/RX XTK, dB | -61.61 | -61.96 | -71.09 | -71.39 | -70.02 | -71.28 | -61.83 | -61.97 | -50 | 11.61 |
| | | | | | | | | | | |
| USB4 Gen3 Gr. 2Gbps Revision 0.91a | | | | | | | | | | |
| Report Time: 28-Jun-2022 16:07:58 | | | | | | | | | | |

FIG. 36

ELECTRICAL CONNECTOR WITH MULTIPLE SHIELDING SPACERS BETWEEN TWO ROWS OF TERMINALS

BACKGROUND OF THE INVENTION

Field of the Invention

The invention relates to an electrical connector, and more particularly to an electrical connector of which two rows of terminals are spaced by separately disposed spacers and mounted to a circuit board by SMT technology and DIP technology.

Description of the Related Art

Electrical connectors are generally used in electrical connection structures of electronic devices, and are used to transmit electronic signals between electronic devices. The most commonly used connector is the Universal Serial Bus (USB) electrical connector. After the development of the type C specification, the electrical connector of the universal serial bus has two rows of terminals correspondingly arranged but with opposite electronic signal characteristics. Crosstalk is likely to occur between the upper and lower rows of terminals due to mutual electromagnetic coupling, which will generate noise (noise) in the electronic signal transmitted by the terminal, especially the differential terminal pair of high-frequency signal, resulting in poor quality of the transmitted electronic signal, thereby affecting the electronic performance of the electronic device.

BRIEF SUMMARY OF THE INVENTION

An object of the present invention is to provide a composite installation type electrical connector, the two rows of terminals are respectively soldered to a circuit board by surface mount technology (SMT) and Dual-in-Line Package technology (DIP), and at the same time between the two rows of terminals arranged in parallel. A plurality of shielding spacers are arranged between a first and a second rows of terminals for shielding effect, so as to avoid crosstalk between the first and second rows of terminals. At the same time, the grounding terminals can be used for grounding. In addition, since the shielding spacers are arranged separately from each other, crosstalk between terminals in the same row can also be avoided.

The invention provides an electrical connector. The electrical connector in accordance with an exemplary embodiment of the invention includes an electrical connector, comprising: a plurality of first terminals arranged in a first terminal row, and each of the first terminals includes a first joint portion joined with a counterpart connector, a soldering portion welded to a pad of a circuit board, and a first connecting portion connecting the first joint portion and the soldering portion; a plurality of second terminals arranged in a second terminal row parallel to the first terminal row, each of the second terminals includes a second joint portion joined with a counterpart connector, an insertion portion inserted into a through hole of the circuit board, and a second connection portion connecting the second joint portion and the insertion portion, wherein each of the first terminal row and the second terminal row includes a pair of regular signal terminals, two functional terminals respectively arranged on opposite sides of the regular signal terminal pair, two power supply terminals respectively arranged on one side of the two functional terminals, two differential terminal pairs respectively arranged on one side of the two power supply terminals and two ground terminals respectively arranged on one side of the two differential terminal pairs, electronic signal characteristics of the first terminals of the first terminal row and the second terminals of the second terminal row are arranged in opposite order to each other, and the first terminals and the second terminals are symmetrically arranged with respect to the central line of the conventional signal terminal pair; and a plurality of shielding spacers arranged between the first terminal row and the second terminal row and are separated from each other by a predetermined distance for insulation, the shielding spacers include two outer shielding spacers, two inner shielding spacers and a middle shielding spacer, each of the outer shielding spacers corresponds to one of the ground terminals and a pair of differential terminal pairs, each of the inner shielding spacers corresponds to one of the functional terminals and one of the power supply terminals, and the middle shielding spacer corresponds to the regular signal terminal pair, the outer shielding spacers and the inner shielding spacers are arranged symmetrically with respect to the middle shielding spacer. The first joint portion of the ground terminal of the first terminal row and the second joint portion of the corresponding ground terminal of the second terminal row are electrically connected to opposite sides of the outer shielding spacer. The first joint portion of the power terminal of the first terminal row and the second joint portion of the corresponding power terminal of the second terminal row are electrically connected to opposite sides of the inner shielding spacer. A distance from the first abutting portion of each first terminal of the first terminal row to the corresponding shielding spacer and a distance from the first connecting portion to the corresponding shielding spacer are equal, and the distance is defined as a first distance. A distance from the second joint portion of each second terminal of the second terminal row to the corresponding shielding spacer and a distance from the second connecting portion to the corresponding shielding spacer are equal, and the distance is defined as a second distance. The first distance is equal to the second distance. A differential terminal of the differential terminal pairs close to the pair of power terminals has a projection on the corresponding outer shielding spacer not exceeding the edge of the corresponding outer shielding spacer.

An electrical connector in accordance with another exemplary embodiment of the invention includes a plurality of first terminals arranged in a first terminal row, and each of the first terminals includes a first joint portion joined with a counterpart connector, a soldering portion welded to a pad of a circuit board, and a first connecting portion connecting the first joint portion and the soldering portion; a plurality of second terminals arranged in a second terminal row parallel to the first terminal row, each of the second terminals includes a second joint portion joined with a counterpart connector, an insertion portion inserted into a through hole of the circuit board, and a second connection portion connecting the second joint portion and the insertion portion, wherein each of the first terminal row and the second terminal row includes a pair of regular signal terminals, two functional terminals respectively arranged on opposite sides of the regular signal terminal pair, two power supply terminals respectively arranged on one side of the two functional terminals, two differential terminal pairs respectively arranged on one side of the two power supply terminals and two ground terminals respectively arranged on one side of the two differential terminal pairs, electronic signal characteristics of the first terminals of the first terminal row and the second terminals of the second terminal row are arranged in opposite order to each other, and the first terminals and the second terminals are symmetrically arranged with respect to the central line of the regular signal terminal pair; and a plurality of shielding spacers arranged between the first terminal row and the second terminal row and are separated from each other by a predetermined distance for insulation, the shielding spacers include two outer shielding spacers, two inner shielding spacers and a middle shielding spacer, each of the outer shielding spacers corresponds to one of the ground terminals and a pair of differential terminal pairs, each of the inner shielding spacers corresponds to one of the functional terminals and one of the power supply terminals, and the middle shielding spacer corresponds to the regular signal terminal pair, the outer shielding spacers and the inner shielding spacers are arranged symmetrically with respect to the middle shielding spacer. The soldering portions of the first terminals of the first terminal row are arranged in a row, the two ground terminals, the regular signal terminal pair, the two power supply terminals of the second terminal row and the insertion portion of the second terminal row are arranged in a first insertion row, and the two differential terminal pairs of the second terminals of the second terminal row and the insertion portion of the two functional terminals are arranged in a second insertion row, the first insertion row and the second insertion row are arranged symmetrically with respect to the centerline. The width of the joint position of the second connection portion and the joint portion of each of the two differential terminal pairs of the second terminal row is greater than the width of other portions of the second connection portion. The first connection portion of the ground terminals of the first terminal row is electrically connected to the outer shielding spacer, and the second connection portion of the ground terminals of the second terminal row is electrically connected to the outer shield spacer.

For the electrical connector of the present invention, the distance from the first joint portion of each first terminal of the first terminal row to the corresponding shielding spacer and the distance from the first connecting portion to the corresponding shielding spacer are equal, and the distance is defined as the first distance. The distance from the second joint portion of each second terminal of the second terminal row to the corresponding shielding spacer and the distance from the second connecting portion to the corresponding shielding spacer are equal, and the distance is defined as a second distance. The first distance is equal to the second distance, so that the shielding spacer can provide an equal shielding effect on the first terminal row and the second terminal row, thereby obtaining a better overall shielding effect. Since the projection of the differential terminal of the differential terminal pair close to the power terminal pair on the corresponding outer shielding spacer does not exceed the edge of the corresponding outer shielding spacer, the outer shielding spacer provides a shielding effect for the differential terminal pair operating at high frequency. Since the width of the connection between the second connection portion and the insertion portion of each differential terminal of the two differential terminal pairs in the second terminal row is greater than the width of other portions of the second connection part, it is possible to cover the part of the second terminal that cannot be glued Avoid increasing impedance.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 35 is a table listing actual measured data of the electrical connector of the present invention; and FIG. 36 is a table listing actual measured data of the electrical connector of the present invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
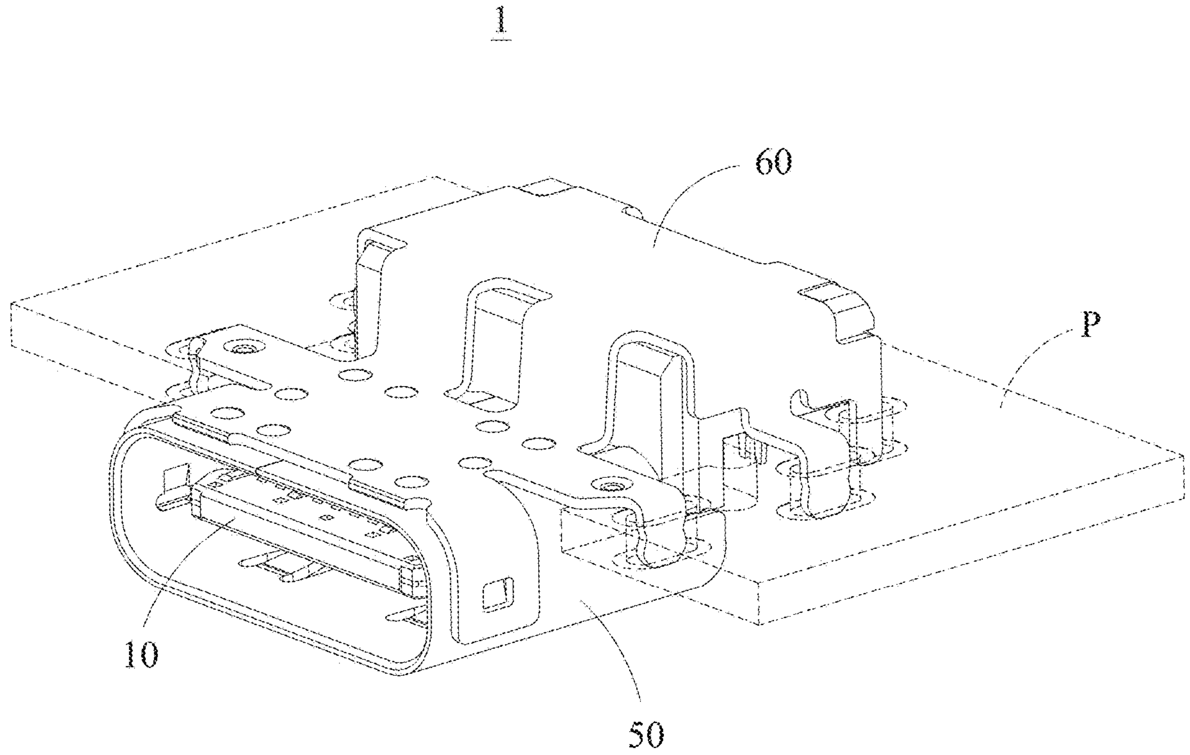
FIG. 1 is a perspective view of an embodiment of an electrical connector of the present invention.
Figure 2:
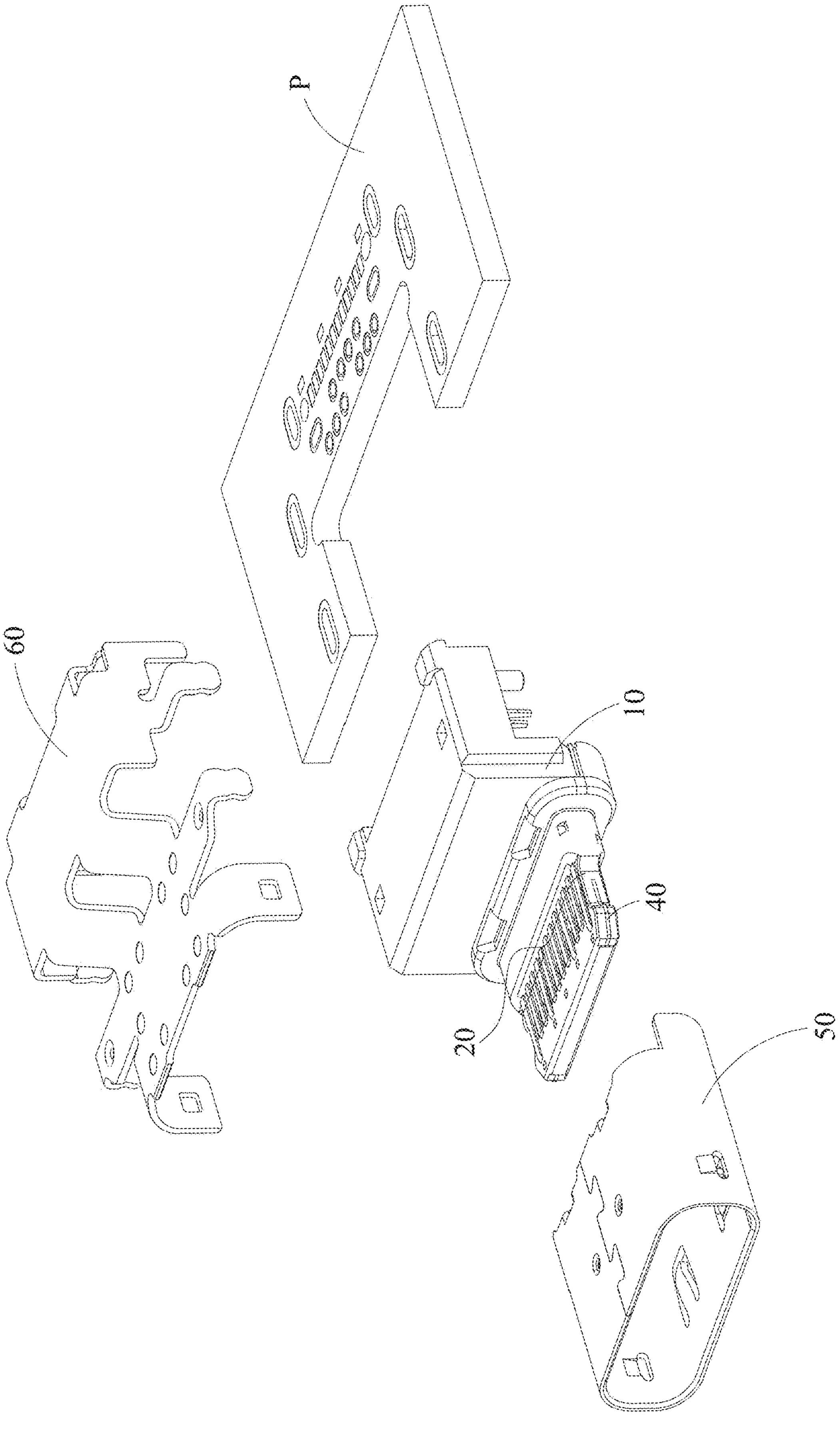
FIG. 2 is a partial exploded view of the electrical connector of FIG. 1.

Referring to FIGS. 1 and 2, an embodiment of the electrical connector of the present invention is presented. The electrical connector 1 of this embodiment is mounted on a circuit board P by surface mount technology and dual in line package technology for electrical connection.

The electrical connector 1 of this embodiment includes an insulating housing 10, a plurality of first terminals 20 and a plurality of second terminals 30 fixed to the insulating housing 10, and a plurality of shielding spacers 40 disposed between the first terminals 20 and the second terminals 30. The electrical connector 1 of this embodiment further includes a first metal shell 50 and a second metal shell 60, the first metal shell 50 and the second metal shell 60 cover the insulating shell 10. A front end of a metal shell 50 forms a insertion opening 51 for insertion of a counterpart connector. A plurality of first terminals 20 and a plurality of second terminals 30 are respectively arranged in a first terminal row and a second terminal row parallel to the first terminal row, wherein the first terminals 20 of the first terminal row are arranged on the circuit board P by surface mount technology, and the second terminals 30 of the second terminal rows are disposed on the circuit board P by dual-in-line package technology.

Figure 3:
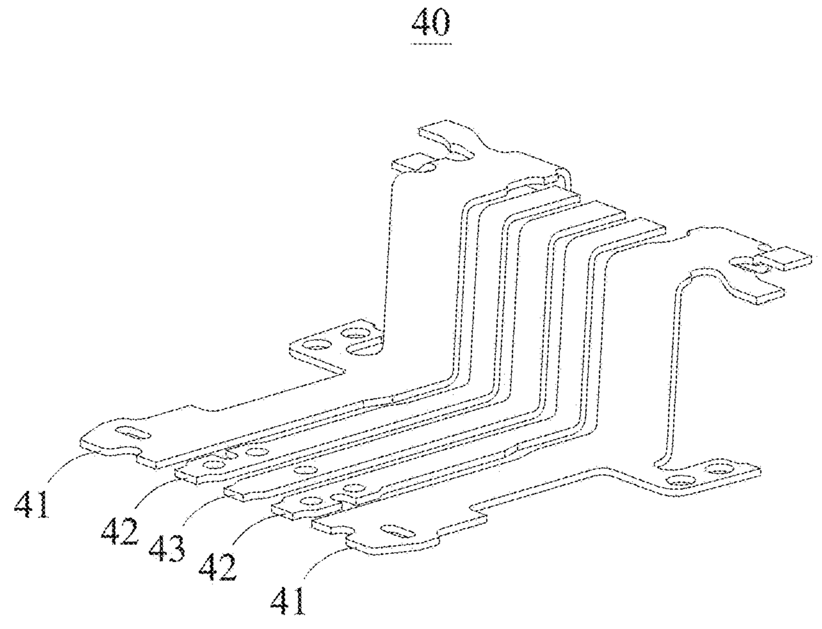
FIGS. 3 to 13 depict a manufacturing process of an electrical connector of the present invention.
Figure 4:
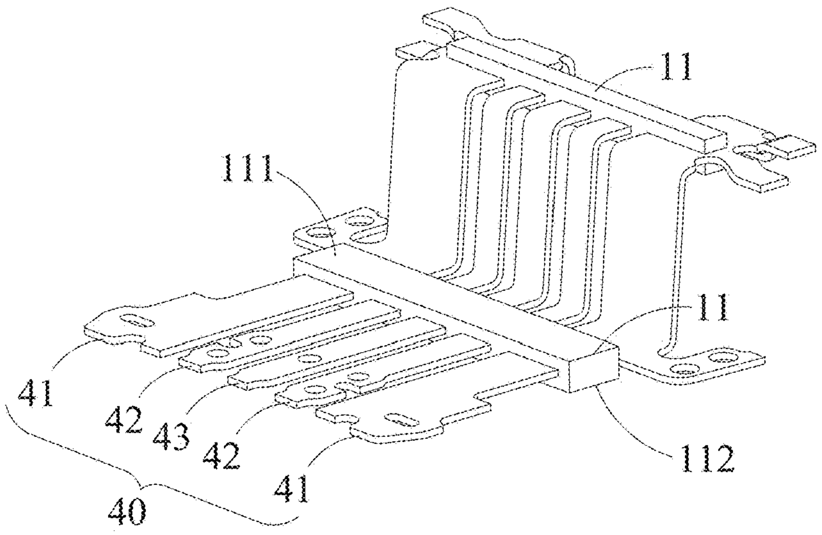

Referring to FIGS. 3 to 13, which depicting the manufacturing process of the electrical connector 1 of the present invention. As shown in FIG. 3, a metal strip is formed into a plurality of shielding spacers 40 by stamping and bending processes, and then as shown in FIG. 4, the plurality of shielding spacers 40 are placed in a mold to form two first insulating positioning structures 11 on the shielding spacer 40 by insert molding process. The plurality of shielding spacers 40 extend through the first insulating positioning structure 11, and are kept in a predetermined distance by the first insulating positioning structures 11. The first insulating positioning structure 11 has a first surface 111 and a second surface 112 opposite to the first surface 111. A distance between the first surface 111 and the shielding spacer 40 is equal to a distance between the second surface 112 and the shielding spacer 40.

Figure 5:
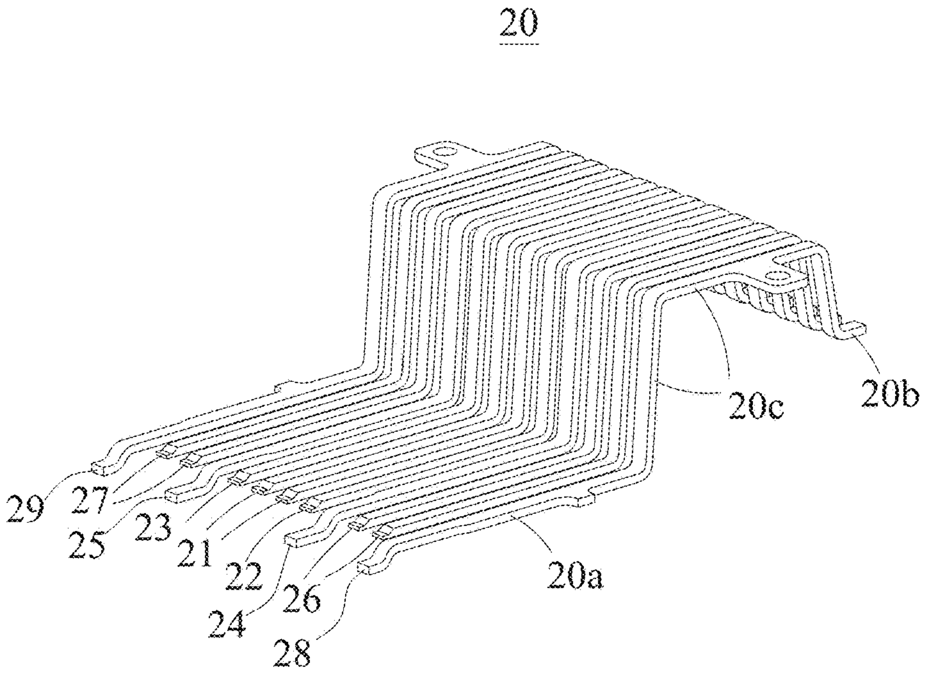
Figure 6:
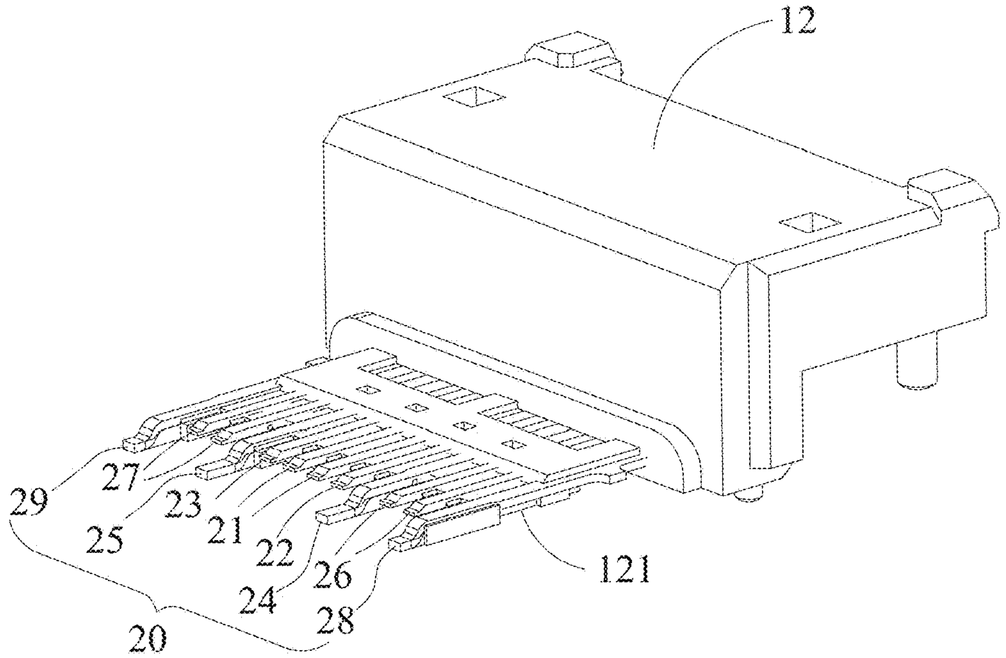

As shown in FIG. 5, the metal strip is punched and bent to form a plurality of first terminals 20. Then, as shown in FIG. 6, a plurality of first terminals 20 are placed in a mold to form a second insulating positioning structure 12 on the plurality of first terminals 20 in a process of insertion molding, and the plurality of first terminals 20 extend through the second insulating positioning structure 12, whereby the plurality of first terminals 20 are kept at a predetermined distance from each other by the second insulating positioning structure 12. The second insulating positioning structure 12 has a third surface 121. Each first terminal 20 includes a first joint portion **20*a* jointed with a counterpart connector, a soldering portion 20*b* soldered to a soldering pad of the circuit board P, and a first connecting portion 20*c* connecting the first joint portion 20*a* and the soldering portion 20*b*. The second insulating positioning structure 12 of this embodiment completely covers the soldering part 20*b* and the first connection part 20*c* and partially covers the lower surface of the first butting part 20*a*, and the second insulating positioning structure 12 corresponds to the first connecting part. The second insulating positioning structure 12 has a first slot 122 (referring to FIG. 15) is formed at the connection of the first connecting portion 20*c* and the soldering portion 20*b* where the first terminal 20 is not covered by the second insulating positioning structure 12 for accommodating the first insulating positioning structure 11. The third surface 121 corresponds to the first abutting portion 20*a*."**

Figure 7:
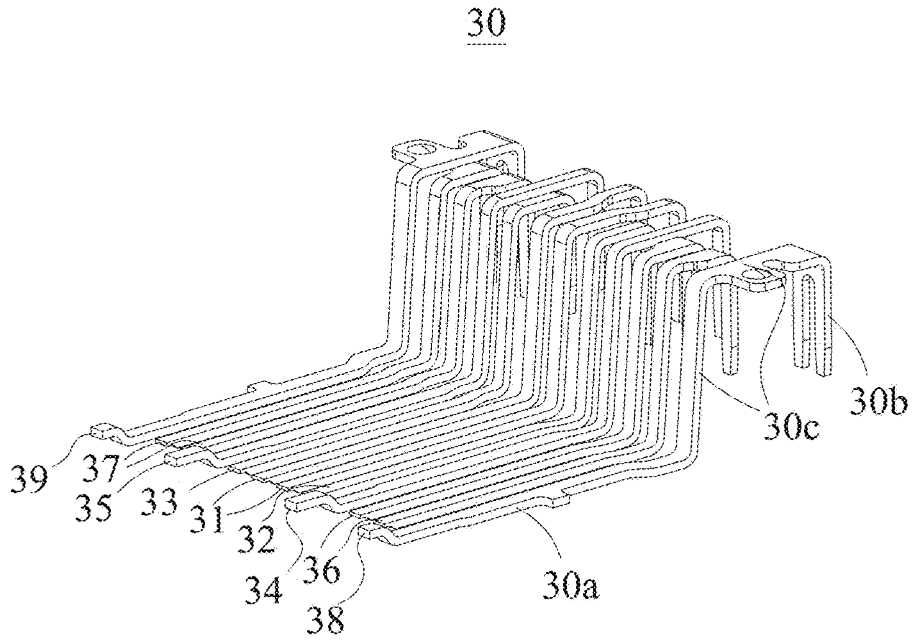
Figure 8:
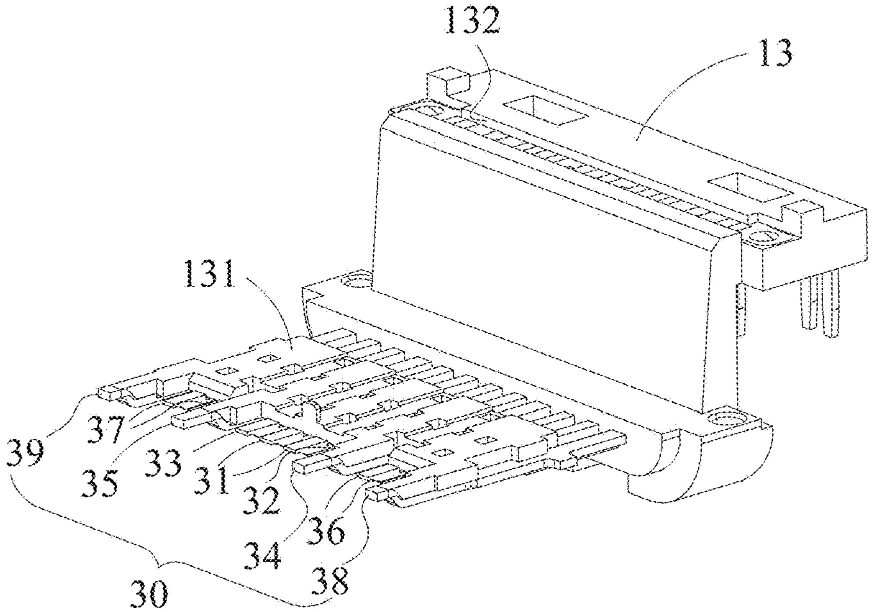

As shown in FIG. 7, a plurality of second terminals 30 are formed by stamping and bending the metal strip. Then, as shown in FIG. 8, a plurality of second terminals 30 are placed in a mold to form a third insulating positioning structure 13 on the plurality of second terminals 30 through the process of insertion molding, and the plurality of second terminals 30 extend through the third insulating positioning structure 13, whereby the plurality of second terminals 30 are kept at a predetermined distance from each other by the second insulating positioning structure 12. The third insulating positioning structure 13 has a fourth surface 131. Each second terminal 30 includes a second joint portion **30*a* jointed with a counterpart connector, an insertion portion 30*b* inserted into a through hole of the circuit board P, and a second connection portion 30*c* connecting the second joint portion 30*a* and the insertion portion 30*b*. The third insulating positioning structure 13 of this embodiment completely covers the second insertion portion 30*b* and the second connecting portion 30*c* and partially covers the upper surface of the second joint portion 30*a*. The third insulating positioning structure 13 at a position corresponding to the connection between the second connecting portion 30*c* and the insertion portion 30*b* forms a second slot 132 where the third insulating positioning structure 13 does not cover the second terminal 30. The second slot 132 corresponds to the is used for accommodating the first insulating positioning structure 11, the second slot 132** corresponds to the first slot.

Figure 9:
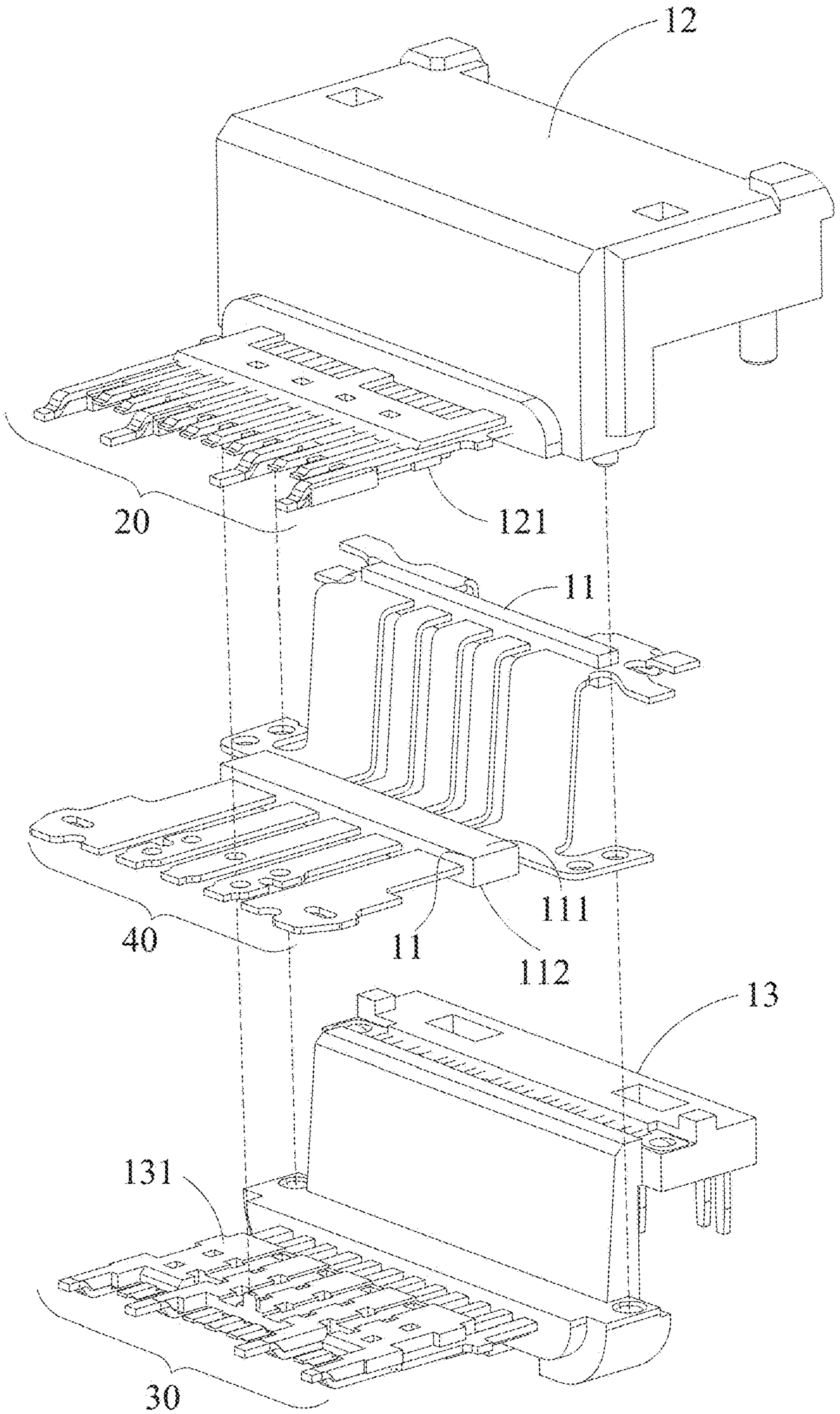
Figure 10:
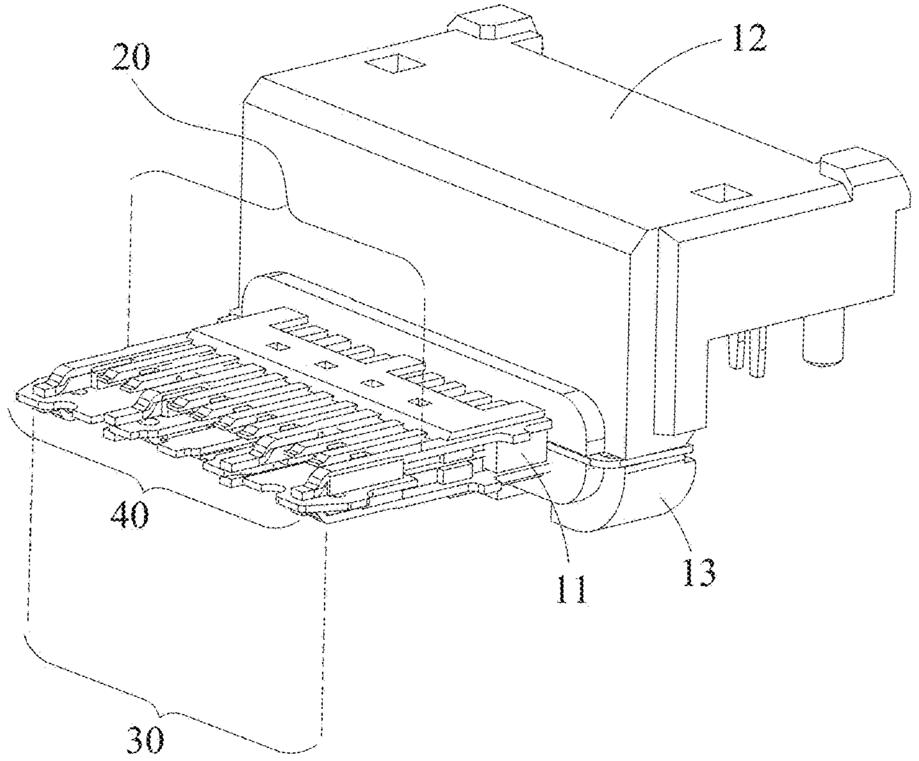
Figure 11:
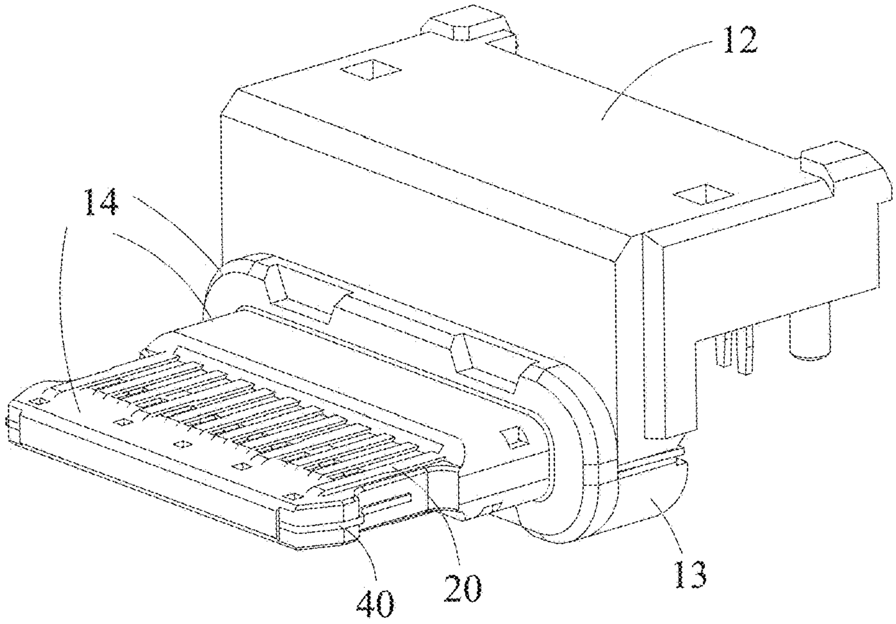

As shown in FIG. 9, the plurality of first terminals 20, the plurality of second terminals 30 and the plurality of shielding spacers 40 that have been positioned are arranged in such a manner that the shielding spacers 40 are located between the plurality of first terminals 20 and the plurality of second terminals. 30. As shown in FIG. 10, an assembly structure is formed by combining the positioning posts and positioning holes of the second insulating positioning structure 12 and the third insulating positioning structure 13 and the positioning holes on the shielding spacer 40. Then, as shown in FIG. 11, the assembled structure of the plurality of first terminals 20, the plurality of second terminals 30 and the plurality of the shielding spacers 40 is put into a mold, and a fourth insulating positioning structure 14 is formed by a process of insertion molding. The fourth insulating positioning structure 14 covers a portion of the first joint portion **20*a* and a portion of the second joint portion 30*a*, only the portion for abutting against the terminal of the counterpart connector is exposed, and the fourth insulating positioning structure 14 completely fills the gap among the first joint portion 20*a*, the second joint portion 30*a*, and the shielding spacer 40 to cover the portions of the shielding spacer 40 corresponding to the first abutting portion 20*a* and the second abutting portion 30*a***.

The electrical connector 1 of this embodiment is an electrical connector of universal serial bus (USB) Type C, so that the first terminal row has 12 first terminals 20 and the second terminal row has 12 second terminals 30. The first terminals 20 of the first terminal row includes a regular signal terminal pair 21 located in the center, two functional terminals 22, 23 respectively arranged on both sides of the regular signal terminal pair 21, two power supply terminals 24, 25 arranged on one side of the two functional terminals 22, 23, two differential terminal pairs 26, 27 respectively arranged on one side of the two power supply terminals 24, 25, and two ground terminals 28, 29 respectively arranged on one side of the two differential terminal pairs 26, 27. The second terminals 30 of the second terminal row includes a regular signal terminal pair 31 located at the center, two functional terminals 32, 33 respectively arranged on both sides of the conventional signal terminal pair 31, and two power supply terminals 34, 35 respectively arranged on one side of the two functional terminals 32, 33. Two differential terminal pairs 36, 37 respectively arranged on one side of the two power supply terminals 34, 35, and two ground terminals 38, 39 respectively arranged on one side of the two differential terminal pairs 36, 37. The configuration of the first terminals 20 of the first terminal row and the second terminals 30 of the second terminal row is arranged according to the specifications of the USB type C, whereby the electronic signal characteristics of the first terminals 20 and the second terminals 30 are arranged in reverse order. The configuration of the first terminals 20 and the second terminals 30 are both symmetrical with respect to a central line of the regular signal terminal pair 21, 31. The so-called symmetrical configuration here includes the terminal arrangement and the terminal shape.

A plurality of shielding spacers 40 arranged in parallel are disposed between the first terminals 20 of the first terminal row and the second terminals 30 of the second terminal row. The plurality of shielding spacers 40 are made of metal and are separated from each other by a predetermined distance for mutual insulation. The plurality of shielding spacers 40 includes two outer shielding spacers 41, two inner shielding spacers 42 and a middle shielding spacer 43. The outer shielding spacer 41 corresponds to the ground terminal 28 and the differential terminal pair 26 in the first terminal row and corresponds to the ground terminal 39 and the differential terminal pair 37 in the second terminal row. The other outer shielding spacer 41 corresponds to the ground terminal 29 and the differential terminal pair 37 in the first terminal row. The differential terminal pair 27 corresponds to the ground terminal 38 and the differential terminal pair 36 in the second terminal row. The inner shielding spacer 42 corresponds to the functional terminals 22 and power terminals 24 in the first terminal row and corresponds to the functional terminals 33 and power terminals 35 in the second row, and the other inner shielding spacer 42 corresponds to the functional terminals 23 and power terminals 25 in the first terminal row, and corresponding to the functional terminals 32 and power terminals 34 in the second terminal row, the middle shielding spacer 43 corresponds to the regular signal terminal pair 21 in the first terminal row and the regular signal terminal pair 31 in the lower row. The two outer shielding spacers 41 and the two inner shielding spacers 42 are arranged symmetrically with respect to the middle shielding spacer 43.

Figure 12:
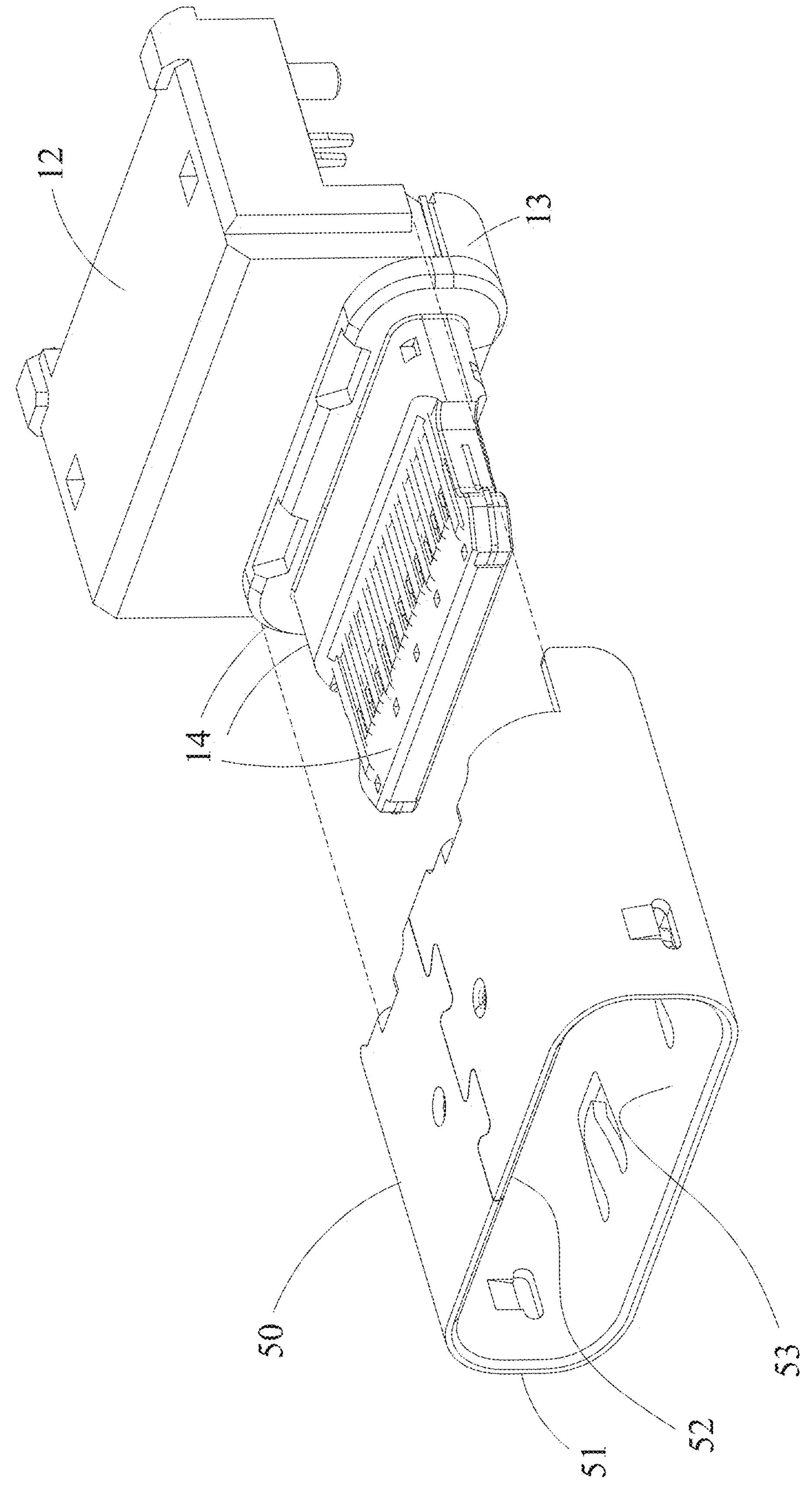

As shown in FIG. 12, the first metal shell 50 is inserted into the fourth insulating positioning structure 14 and the first metal shell 50 is positioned on the fourth insulating positioning structure 14 in a snap-fitting manner. The first joint portion 20*a* of the first terminal 20 and the second joint portion 30*a* of the second terminal 30 are located inside the first metal shell 50. The first metal shell 50 has a cylindrical structure, one end of which forms the insertion port 51, and the other end abuts against the fourth insulating positioning structure 14 and is closed by the fourth insulating positioning structure 14.

Figure 13:
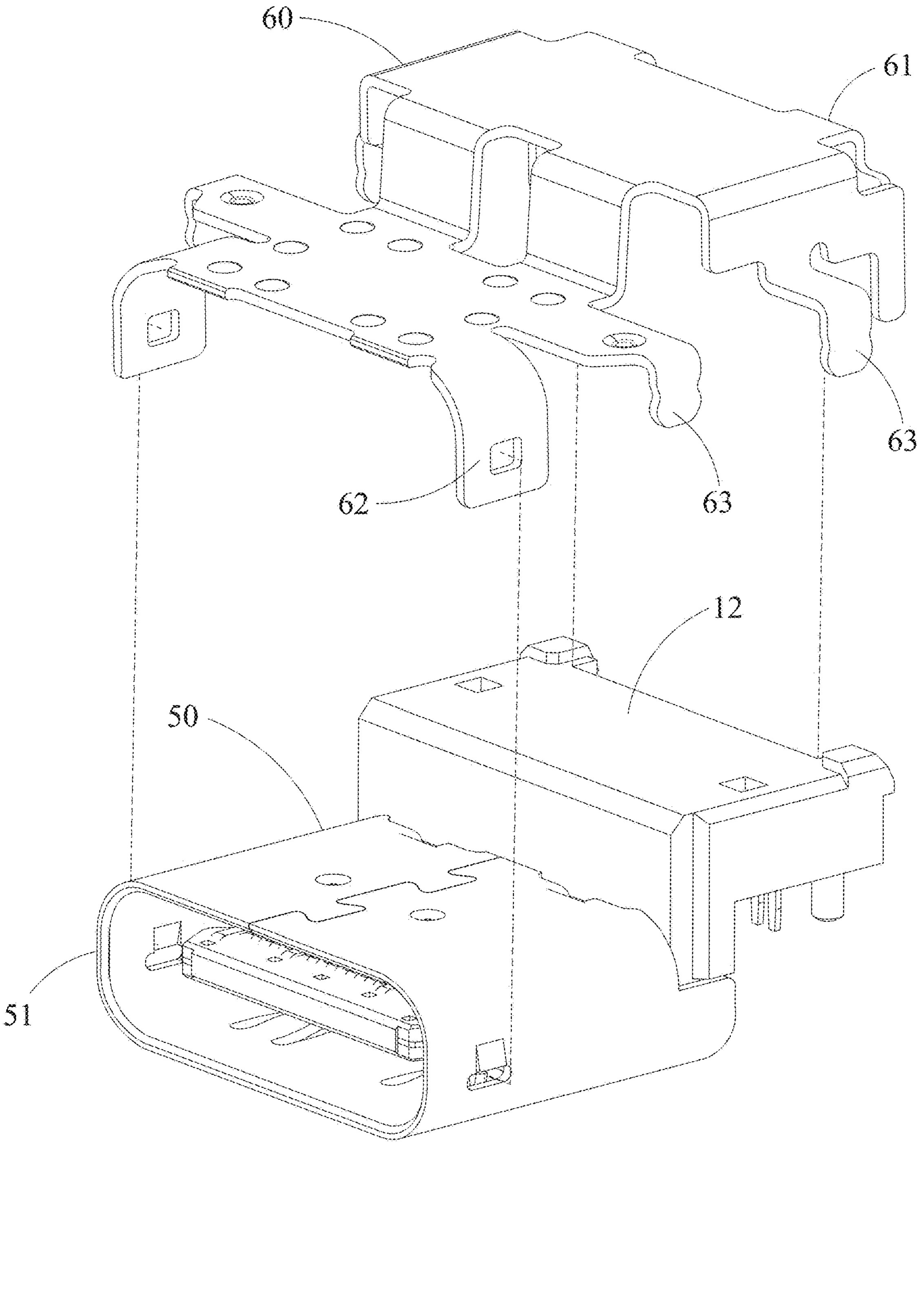

As shown in FIG. 13, the second metal shell 60 is engaged with the rear end of the second insulating positioning structure 12 and the first metal shell 50 with engaging structures 61 and 62 respectively. The second metal shell 60 includes a insertion part 63, the second metal shell 60 is positioned on the circuit board P together with the entire electrical connector 1.

Figure 14:
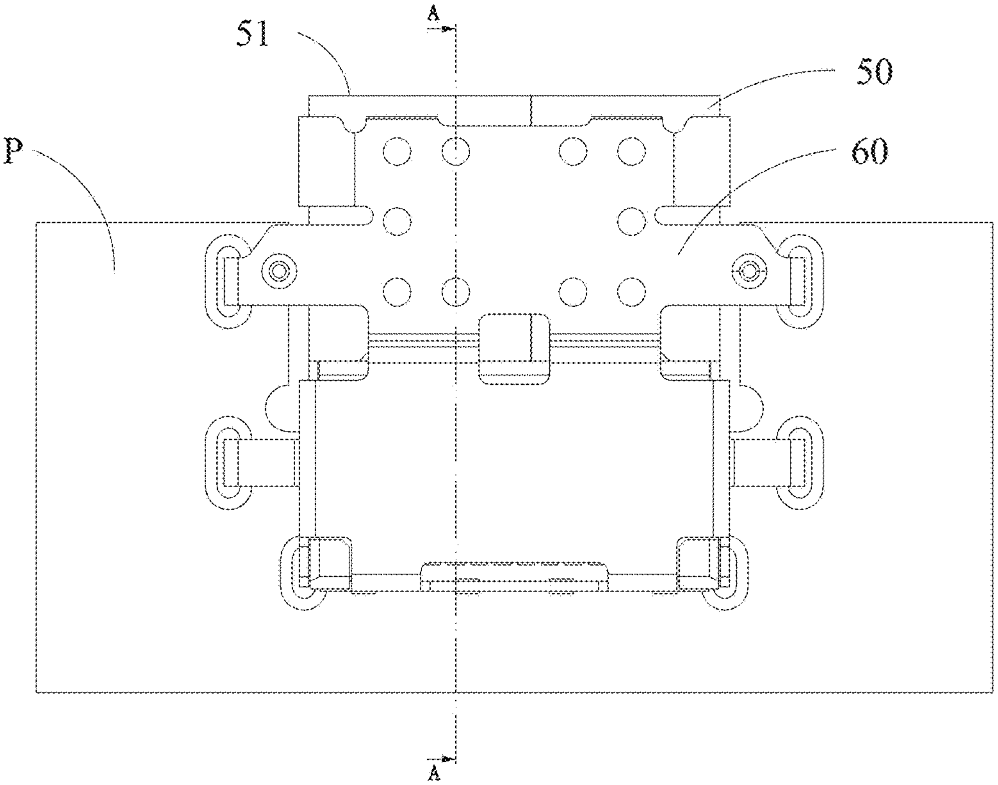
FIG. 14 is a top view of the electrical connector of FIG. 1.
Figure 15:
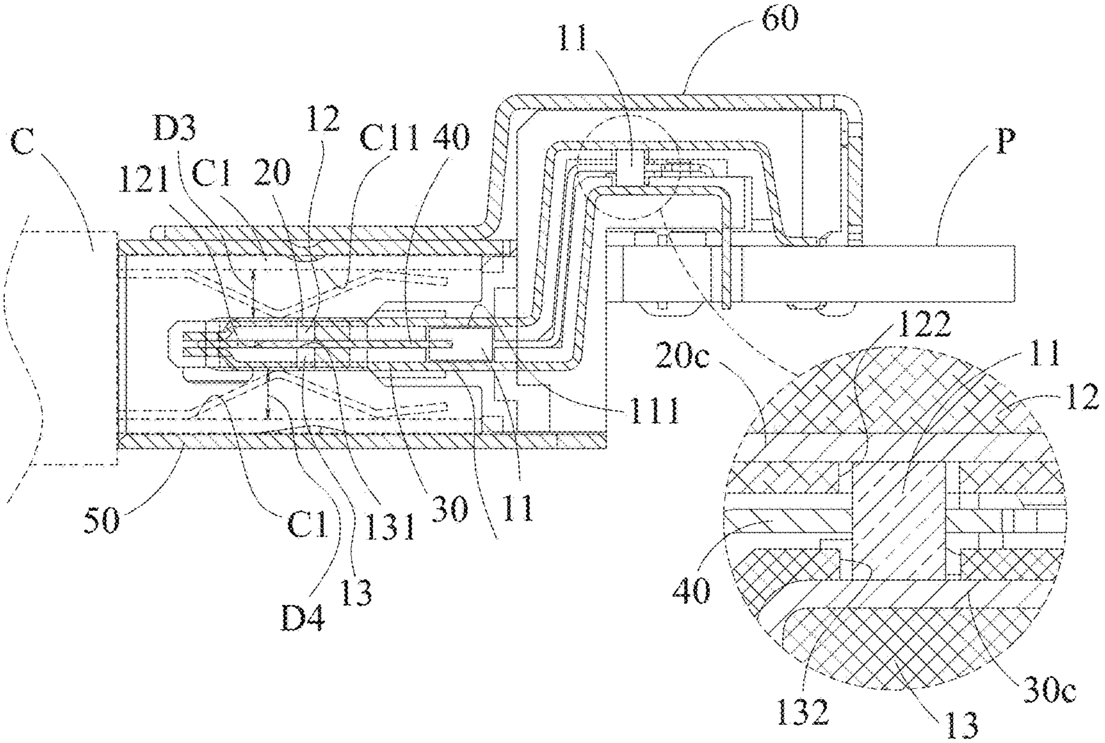
FIG. 15 is a cross section of a line A-A of FIG. 14.
Figure 16:
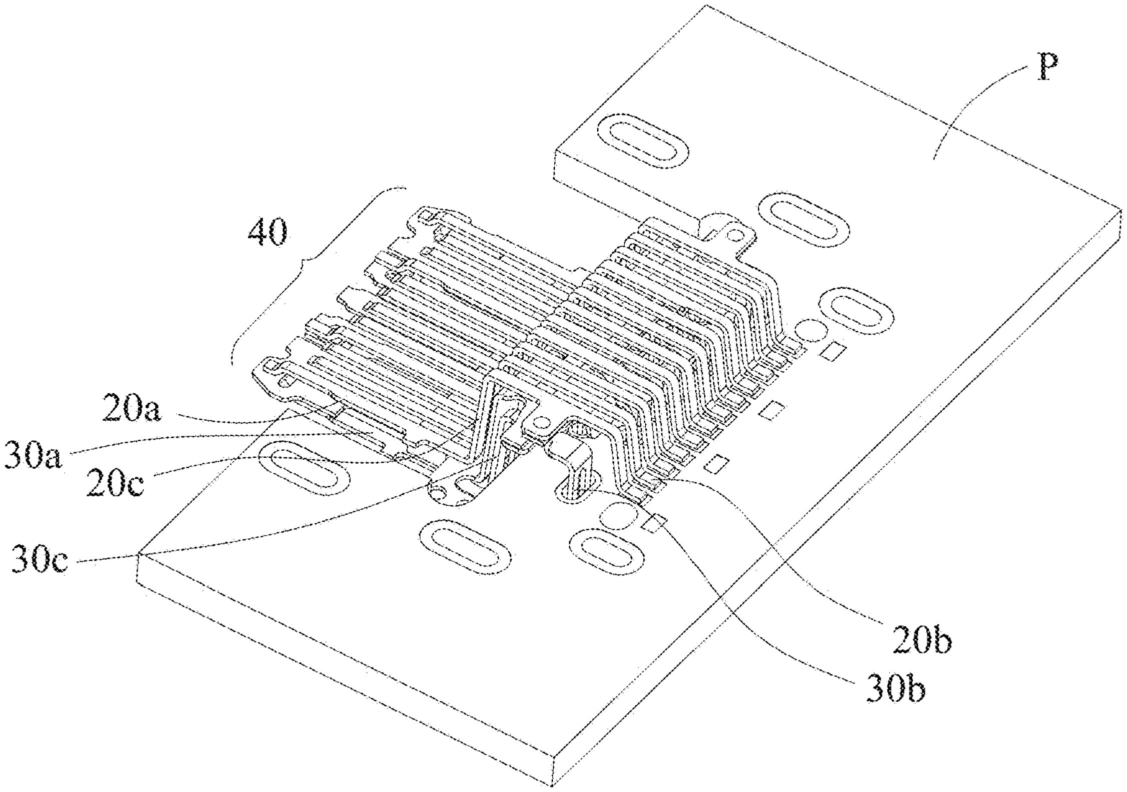
FIG. 16 is a perspective view of the electrical connector of FIG. 1, wherein a first terminal row, a second terminal row and shielding spacers are connected to a circuit board.

Referring to FIG. 14 and FIG. 15, the first metal shell 50 has a first inner surface 52 and a second inner surface 53 opposite to the first inner surface 52. The first inner surface 52 corresponds to the first joint portion 20 a of the first terminal 2, and the second inner surface 53 corresponds to the second joint portion 30*a* of the second terminal 30. A distance from the first inner surface 52 to an upper surface of the first joint portion 20*a* is equal to a distance from the second inner surface 53 to the lower surface of the second joint portion 30*a*. When the counterpart connector C is inserted into the first metal shell 50 from the insertion opening 51, a distance D3 from the first joint portion 20*a* of the first terminal 20 to the inner surface C11 of the metal shell C1 of the counterpart connector C corresponding to the first terminal 20 is equal to a distance D4 from the second joint portion 30*a* of the second terminal 30 to the inner surface C12 of the metal shell C1 of the counterpart connector C corresponding to the second terminal 30.

In addition, a distance from the first connection portion 20*c* of the first terminal 20 to the inner surface of the second metal shell 60 is equal to a distance from the second connection portion 30*c* of the second terminal 30 to the circuit board P.

Referring to FIGS. 16 to 22, the first joint portion 20*a* of the ground terminals 28, 29 of the first terminal row in this embodiment and the second joint portion 30*a* of the corresponding ground terminals 38, 39 of the second terminal row are electrically connected to opposite sides of the outer shielding spacer 41, wherein the first joint portion 20*a* of the power terminals 24, 25 of the first terminal row and the second joint portion 30*a* of the corresponding power terminals 35, 34 of the second terminal row are electrically connected to opposite sides of the inner shielding spacer 42.

A distance from the first joint portion 20*a* of each first terminal 20 of the first terminal row to the corresponding shielding spacer 40 is equal to a distance from the first connecting portion 20*c* to the corresponding shielding spacer 40, and the distance is defined as a first distance D1. A distance from the second joint portion 30*a* of each second terminal 30 in the second terminal row to the corresponding shielding spacer 40 is equal to a distance from the second connecting portion 30*c* to the corresponding shielding spacer 40, the distance is defined as a second distance D2. The first distance D1 is equal to the second distance D2. That is, a distance from the first joint portion 20*a* and the first connecting portion 20*c* of the first terminal 20 to the corresponding shielding spacer 40 is equal to a distance from the second joint portion 30*a* and the second connecting portion 30*c* of the second terminal 30 to the corresponding shielding spacer 40. Referring to FIG. 15 again, in this embodiment, the third surface 121 of the second insulating positioning structure 12 props against an upper surface of the shield spacer 40, and the fourth surface 131 of the third insulating positioning structure 13 props against the shielding spacer 40. The lower surface of the spacer 40 makes the first distance D1 equal to the second distance D2. In other embodiments, the first surface 111 and the second surface 112 of the first insulating positioning structure 11 prop against a lower surface of the first terminal 20 and an upper surface of the second terminal 30 respectively, whereby the first distance D1 is equal to the second distance D2.

Figure 19:
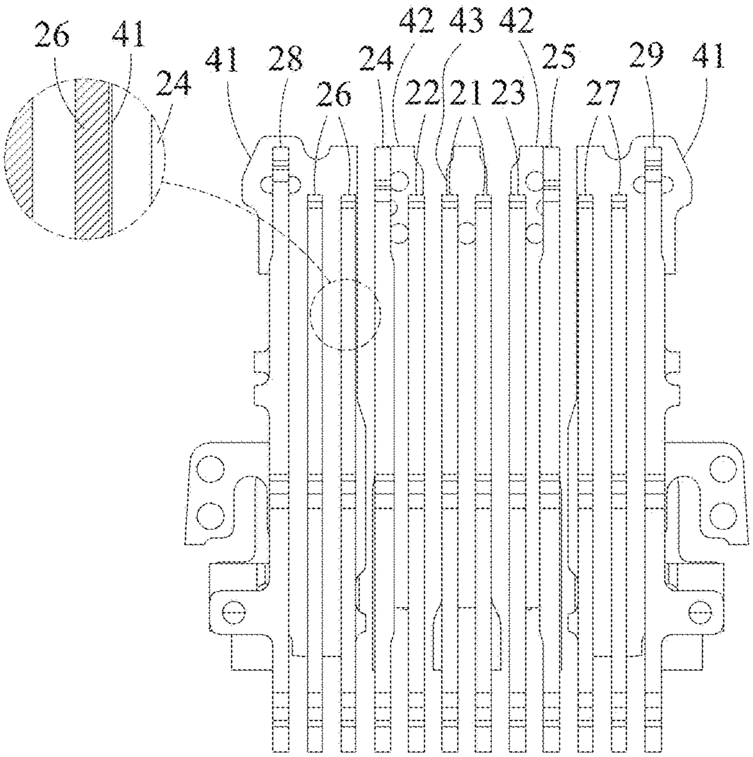
FIG. 19 is a top view of FIG. 17.
Figure 20:
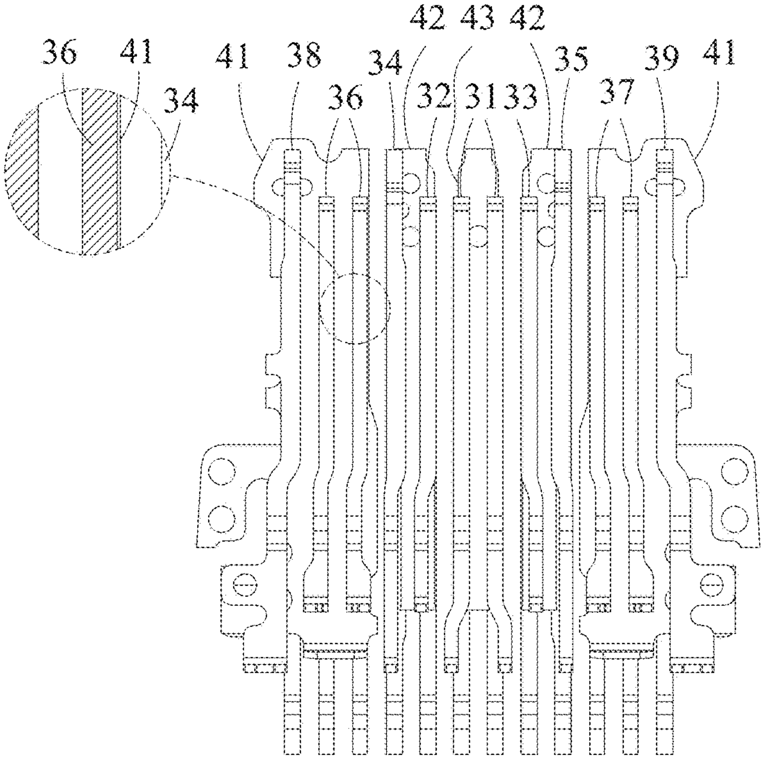
FIG. 20 is a bottom view of FIG. 17.
Figure 21:
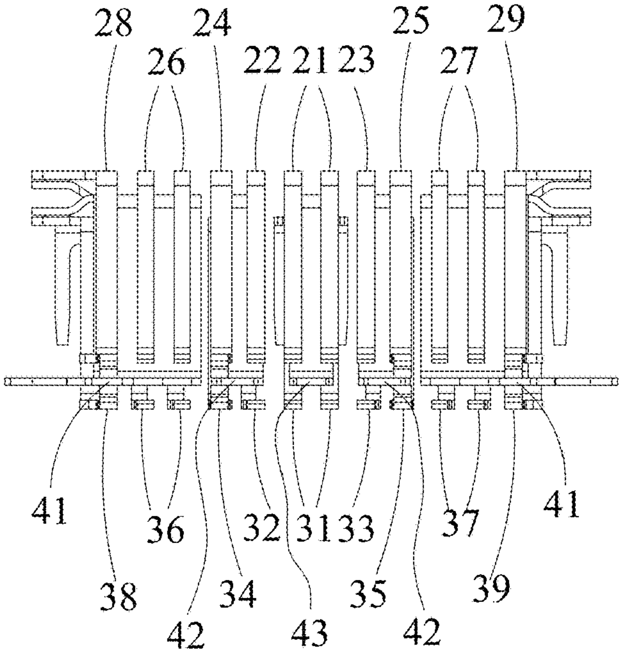
FIG. 21 is a front view of FIG. 17.
Figure 22:
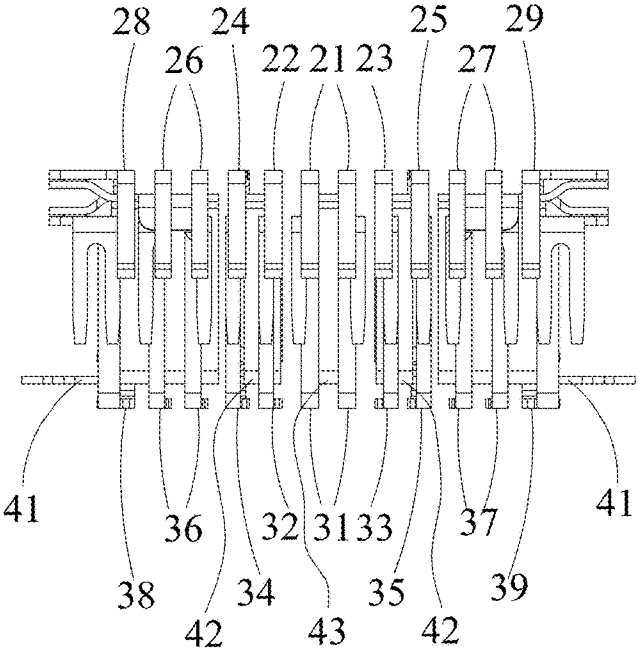
FIG. 22 is a back view of FIG. 17.

As shown in FIG. 19, the projection of the differential terminals of the differential terminal pair 26, 27 close to the power terminal pair 24, 25 on the corresponding outer shielding spacer 41 does not exceed the edge of the corresponding outer shielding spacer 41. As shown in FIG. 20, the projection of the differential terminals of the differential terminal pair 36, 37 close to the power terminal pair 34, 35 on the corresponding outer shielding spacer 41 does not exceed the edge of the corresponding outer shielding spacer 41.

Referring to FIGS. 5 and 7 together, the soldering portion 20*b* of the first terminal 20 of the first terminal row is arranged in a row, and the two ground terminals 38, 39, the regular signal terminal pair 31 and the insertion portion 30*b* of the two power terminals 34, 35 of the second terminals 30 of the second terminal row are arranged in a first insertion row, and the insertion portions of the two differential terminal pairs 36, 37 and two functional terminals 32, 33 of the second terminal 30 of the second terminal row are arranged in a second insertion row. The first insertion row and the second insertion row are arranged symmetrically with respect to a central line.

Figure 17:
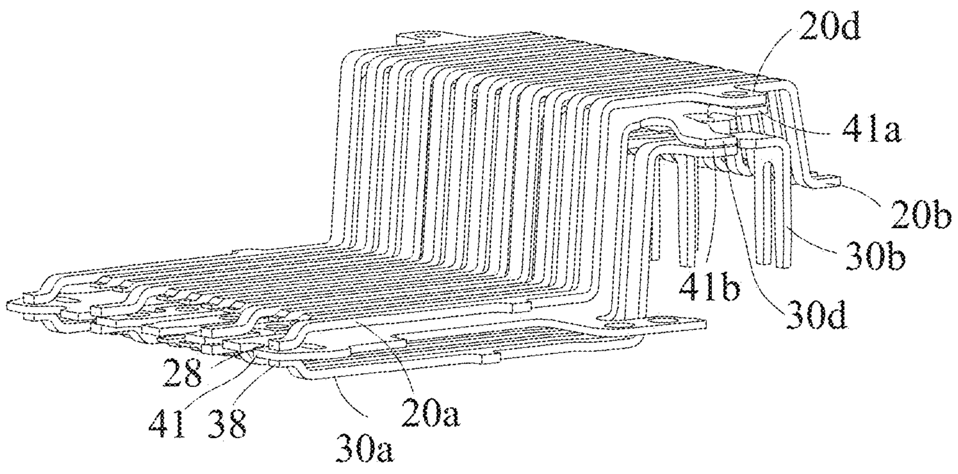
FIG. 17 is a perspective view of the arrangement of the first terminal row, the second terminal row and the shielding spacers of the electrical connector of FIG. 1.
Figure 18:
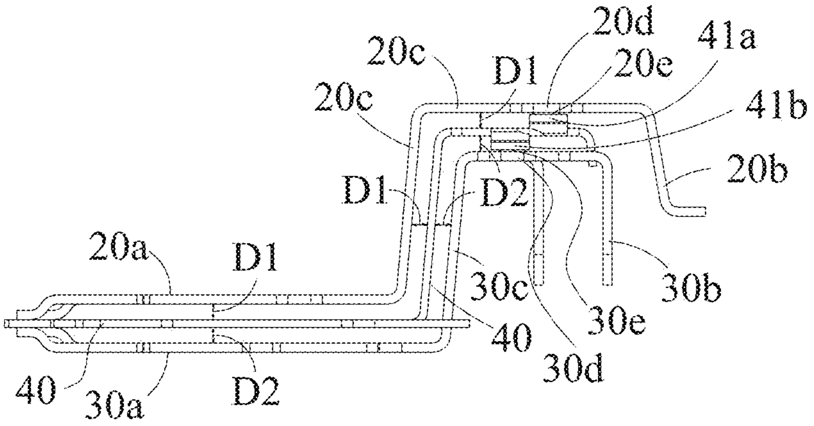
FIG. 18 is a right-hand-side view of FIG. 17.

As shown in FIGS. 17 and 18, the first connecting portion 20*c* of the grounding terminals 28, 29 of the first terminal 20 of the first terminal row has a lateral flange 20*d*, and the second connecting portion 30*c* of the grounding terminal 38, 39 of the second terminal 30 of the second terminal row has a lateral flange 30*d*, and the outer shielding spacer 41 is respectively provided with lateral flange 41*a*, 41*b* at the first connecting portion 20*c* of the corresponding grounding terminal 28, 29 and the second connecting portion 30*c* of the grounding terminal 38, 39. The lateral flange 41*a* is bent and extended upwards to prop against the lateral flange 20*d* of the first connecting portion 20*c*, and the lateral flange 41*b* is bent and extended downwards to prop against the second lateral flange 20*c*. The lateral flange 30*d* of the connection portion 30*c*, whereby the first connection portion 20*c* of the ground terminals 28, 29 is electrically connected to the outer shielding spacer 41, and the second connection portion 30*c* of the ground terminals 38, 39 is electrically connected to the outside shield spacer 41. The lateral flange 20*d* has a first protrusion 20*e*, the lateral flange 30*d* has a second protrusion 30*e*, the first protrusion 20*e* of the lateral flange 20*d* props against the lateral flange 41*a* of the outer shielding spacer 41, The second protrusion 30*e* of the lateral flange 30*d* props against the lateral flange 41*b* of the outer shielding spacer 41.

Figure 23:
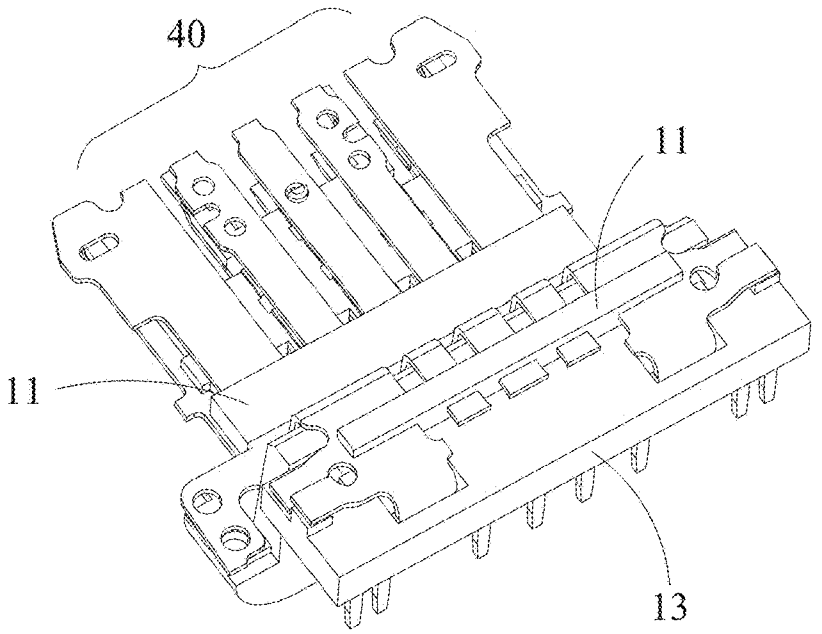
FIGS. 23 and 24 depict a position of the differential terminal pair having a greater width where no insulating covering structure exists.
Figure 24:
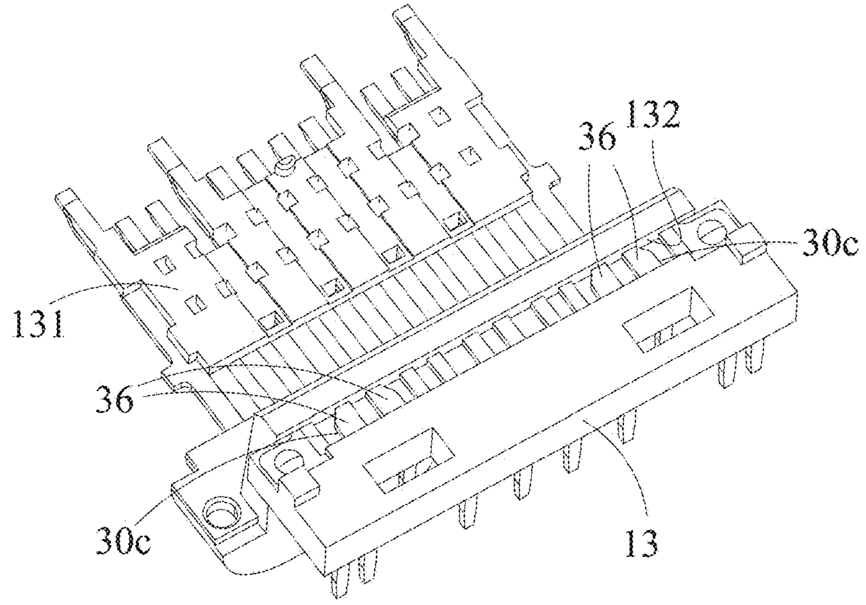
Figure 25:
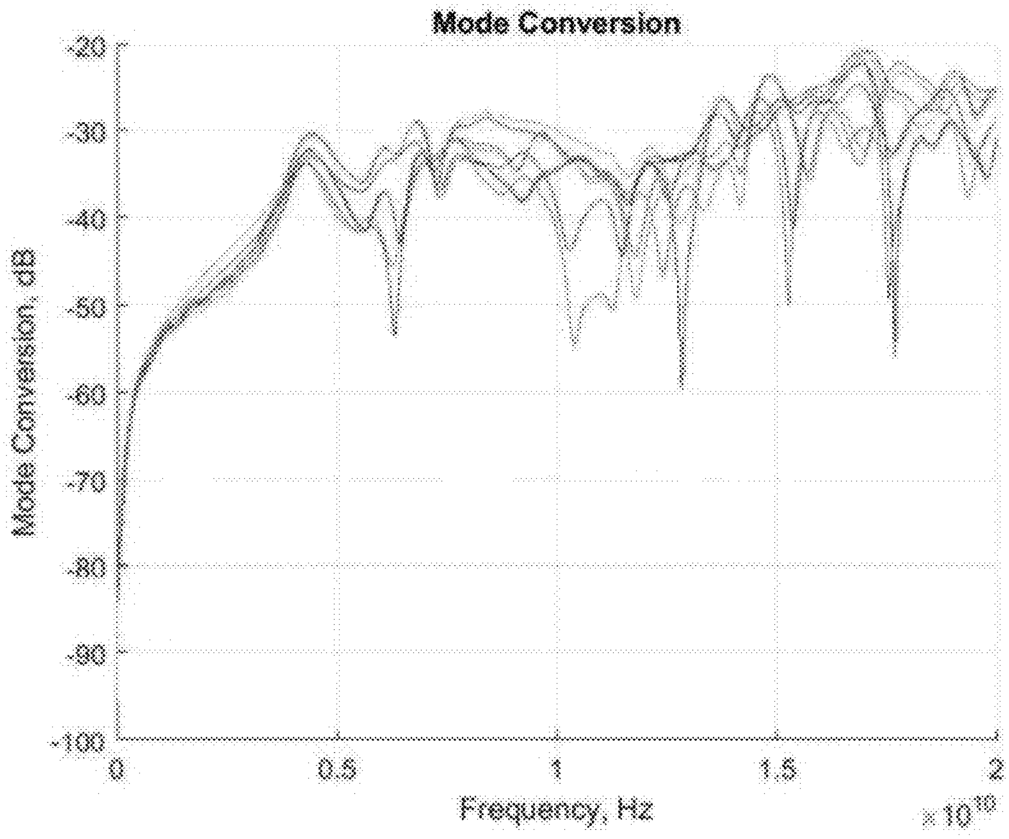
FIG. 25 is a correlation diagram of differential mode/common mode conversion vs signal frequency of the electrical connector of the present invention accomplished by software simulation.
Figure 26:
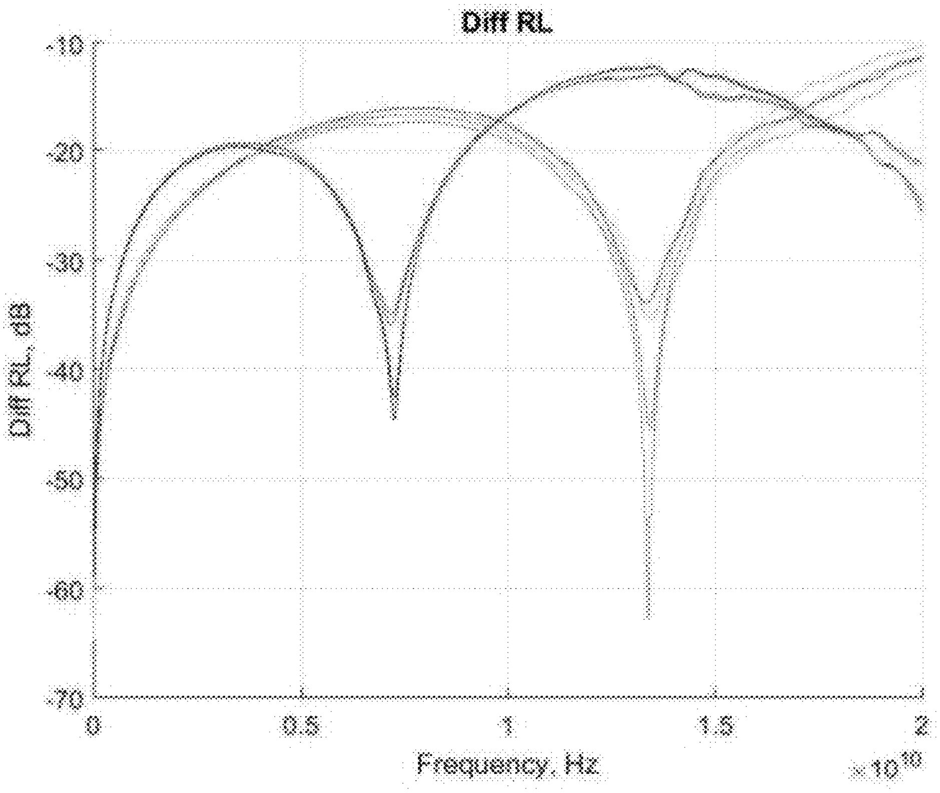
FIG. 26 is a correlation diagram of return loss vs signal frequency of the electrical connector of the present invention accomplished by software simulation.
Figure 27:
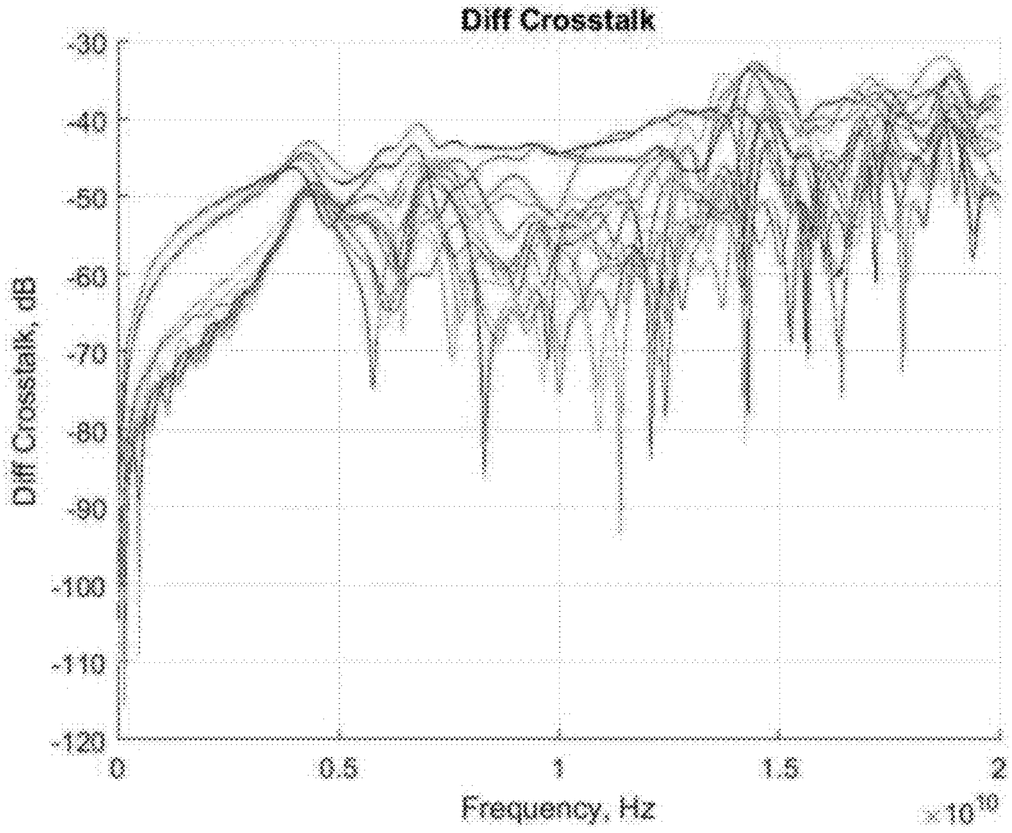
FIG. 27 is a correlation diagram of crosstalk vs signal frequency of the differential terminal pair of the electrical connector of the present invention accomplished by software simulation.
Figure 28:
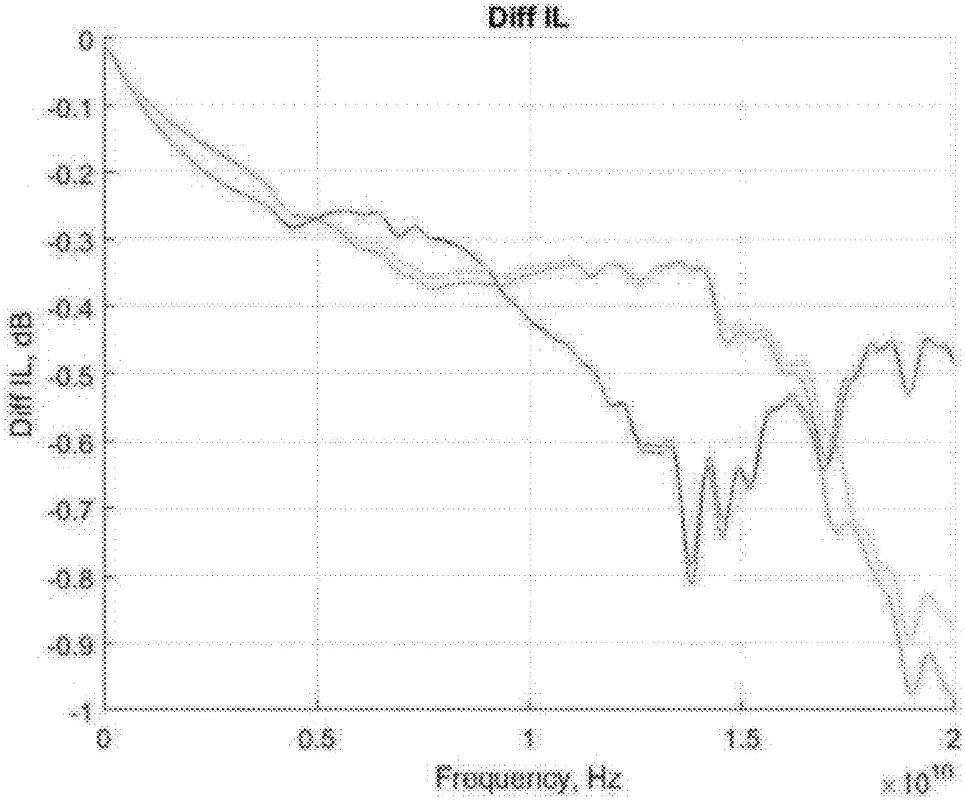
FIG. 28 is a correlation diagram of insertion loss vs signal frequency of the electrical connector of the present invention accomplished by software simulation.
Figure 29:
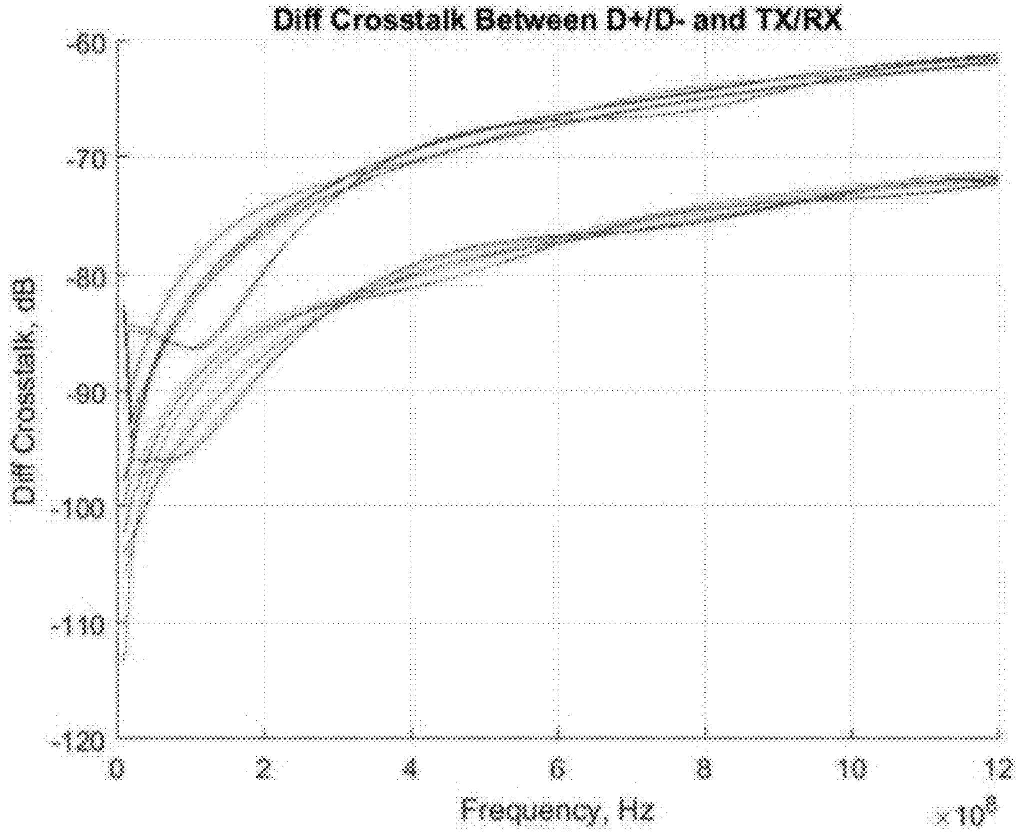
FIG. 29 is a correlation diagram of crosstalk between the regular signal terminal and the differential signal terminal vs signal frequency of the electrical connector of the present invention accomplished by software simulation.
Figure 30:
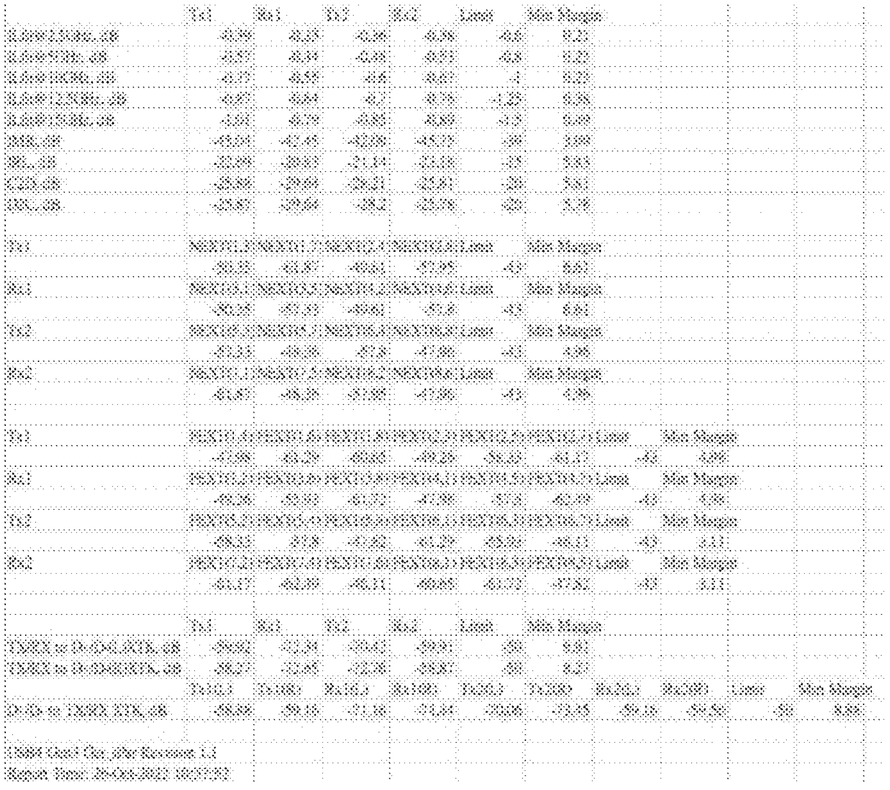
FIG. 30 is a correlation diagram of differential mode/common mode conversion vs signal frequency of the electrical connector of the present invention accomplished by measurement.
Figure 31:
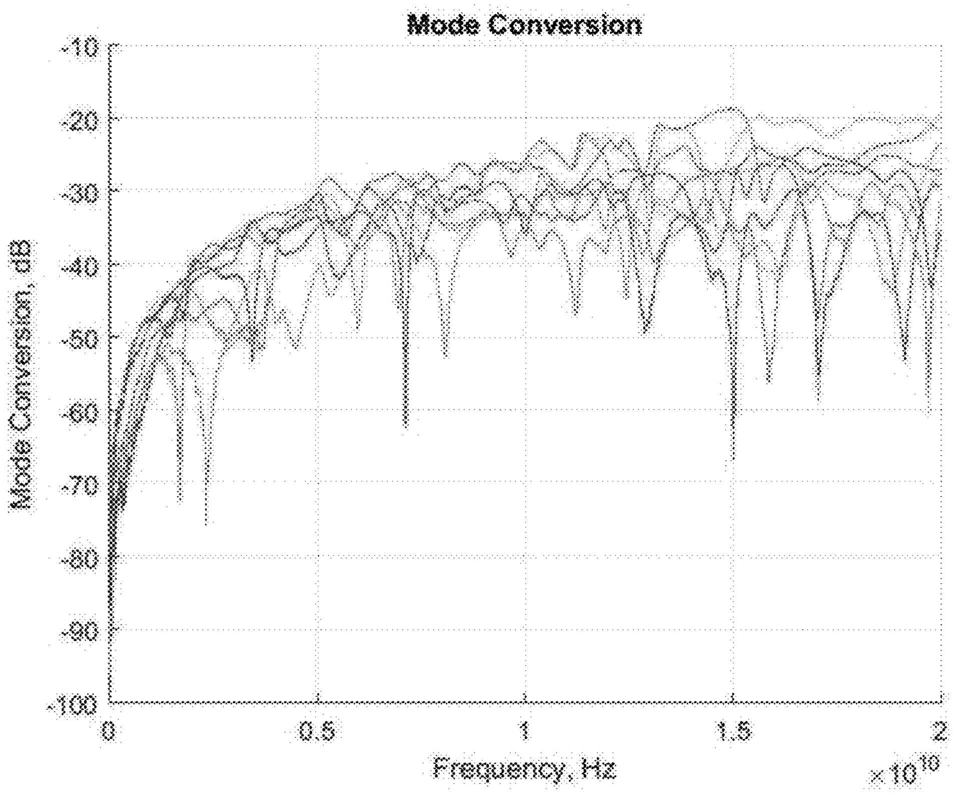
FIG. 31 is a correlation diagram of return loss vs signal frequency of the electrical connector of the present invention accomplished by measurement.
Figure 32:
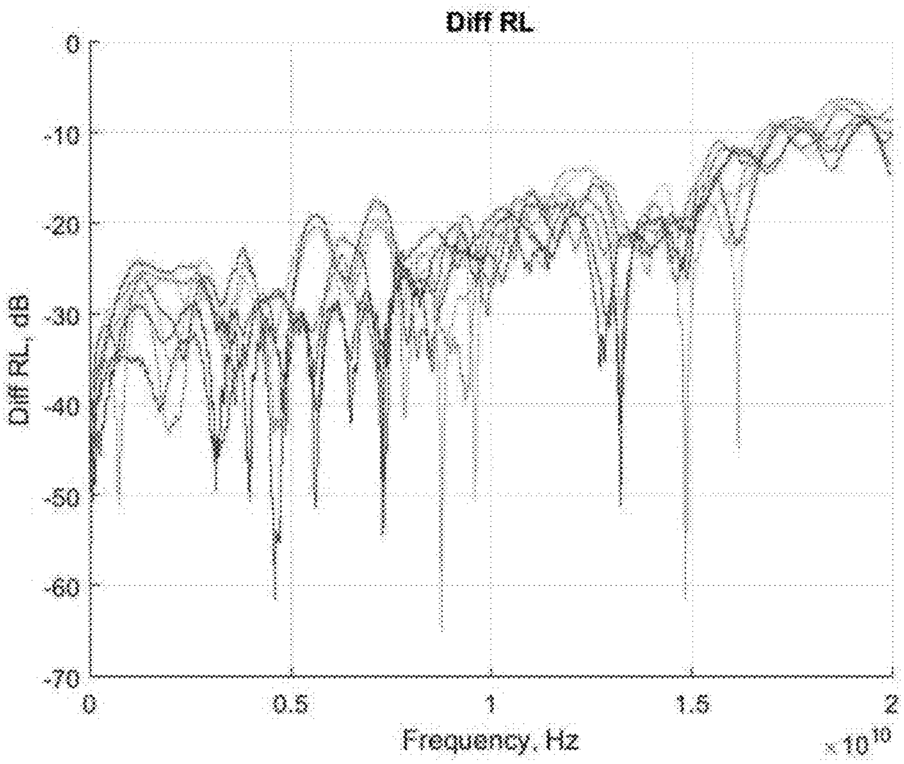
FIG. 32 is a correlation diagram of crosstalk vs signal frequency of the differential terminal pair of the electrical connector of the present invention accomplished by measurement.
Figure 33:
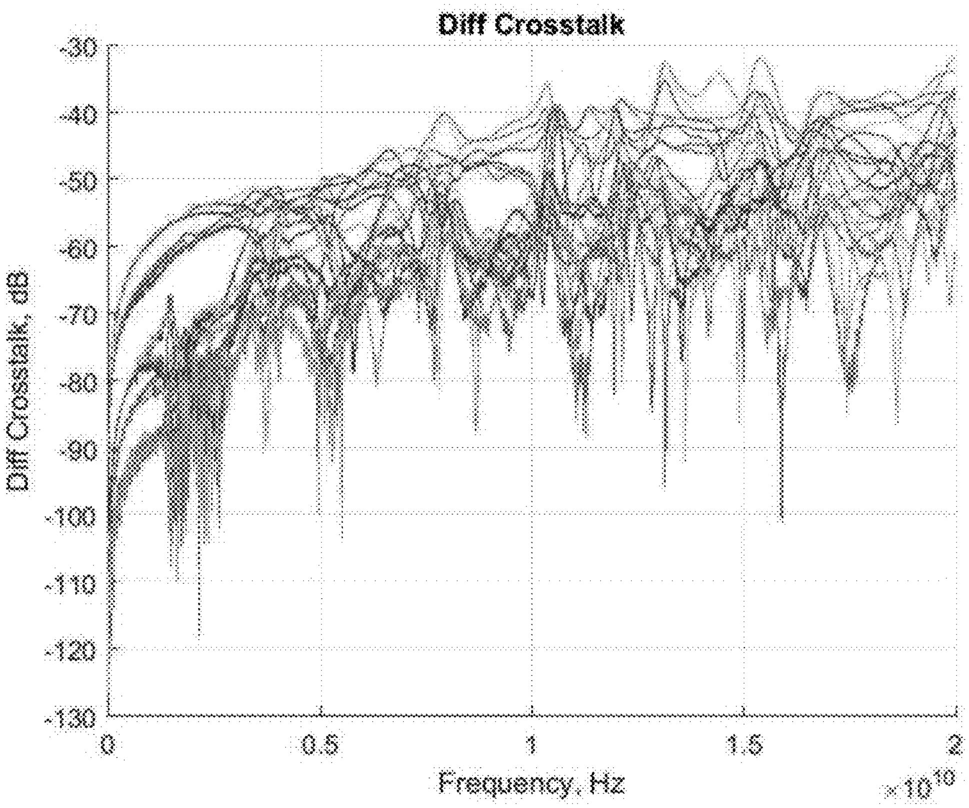
FIG. 33 is a correlation diagram of insertion loss vs signal frequency of the electrical connector of the present invention accomplished by measurement.
Figure 34:
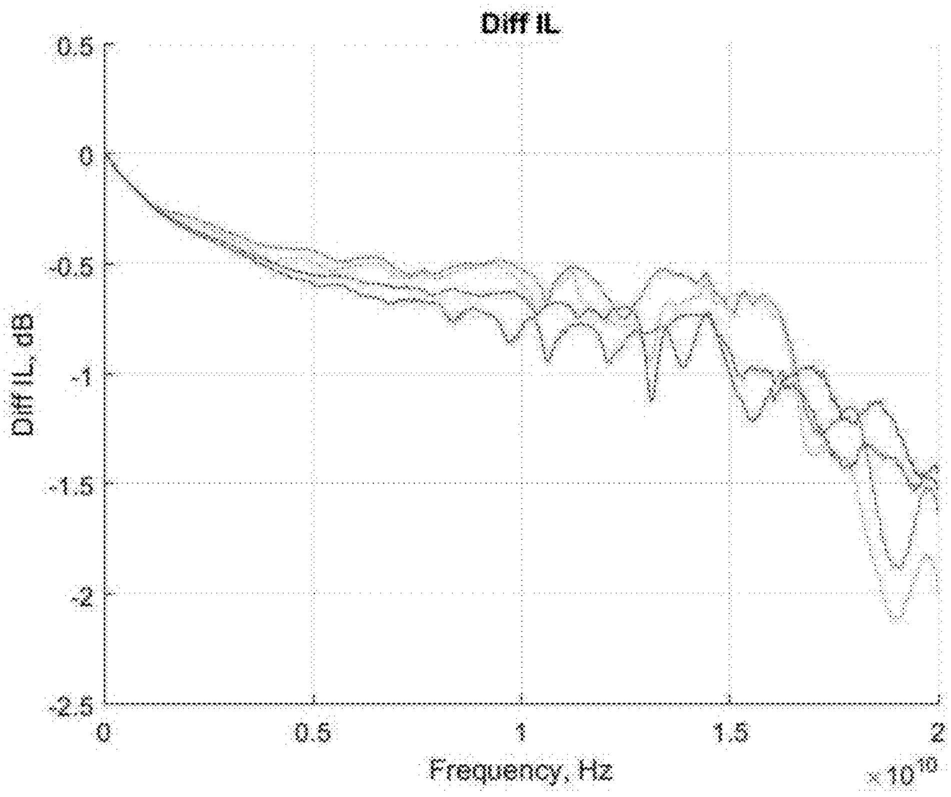
FIG. 34 is a correlation diagram of crosstalk between the regular signal terminal and the differential signal terminal vs signal frequency of the electrical connector of the present invention accomplished by measurement.

Referring to FIGS. 23 and 24, which show that the third insulating positioning structure 13 has a second slot 132 formed at a position corresponding the connection between the second connecting portion 30*c* and the insertion portion 30*b*, for accommodating the first insulating positioning structure 11, wherein FIG. 24 shows that after removing the first insulating positioning structure 11 and the shielding spacer 40 in FIG. 23, the second slot 132 of the third insulating positioning structure 13 and the differential terminal of the second terminal 30 are exposed. The connection between the second connecting portion 30*c* and the insertion portion 30*b* of the differential terminal pairs 36, 37 is exposed from the second slot 132, whereby the second terminal 30 is partially exposed by the third insulating positioning structure 13 here, whereby it will cause Impedance increases. Since the differential terminal pairs 36, 37 are used to transmit high-frequency signals, the increase in impedance will affect the transmission of high-frequency signals, whereby the width of the connection between the second connecting portion 30*c* and the plug-in portion 30*b* is larger than that of the differential terminal pairs 36, 37 of the second terminal 30. The width of the other part of 37 reduces the impedance value by increasing the cross-sectional area of the conductor, thereby compensating for the increase in impedance caused by the second slot 132.

FIGS. 25 to 29 are software simulations of the differential mode/common mode conversion, return loss, crosstalk of differential signal terminal pairs, insertion loss, and crosstalk between conventional signal terminal pairs and differential signal terminal pairs of the electrical connector 1 of the present invention. The following table 1 shows various data of the electrical connector 1 of the present invention simulated by software. FIGS. 30 to 34 are actual measurements of the differential mode/common mode conversion, return loss, crosstalk of differential signal terminal pairs, insertion loss, and crosstalk between conventional signal terminal pairs and differential signal terminal pairs of the electrical connector of the present invention. In the drawings, Table 2 shows the actual measured data of the electrical connector of the present invention. The electrical connector of the present invention complies with the specification of USB4 2.0 whether it is simulated by software or actually measured. The differential-to-common-mode conversion is −20 dB to −30 dB at 10 GHz and remains below −20 dB at frequencies above 10 GHz. For example, the insertion loss needs to be greater than 7.5 dB at 10 GHz, and the insertion loss of the electrical connector of the present invention is −0.5 dB to −1.0 dB at 10 GHz.

TABLE 1

The various data of the electrical connector 1 of the present invention simulated by software

| | Tx1 | Rx1 | Tx2 | Rx2 | Limit | Min Margin |
|---|---|---|---|---|---|---|
| ILfit@2.5 GHz, dB | −0.19 | −0.18 | −0.18 | −0.19 | −0.6 | 0.41 |
| ILfit@5 GHz, dB | −0.27 | −0.27 | −0.26 | −0.27 | −0.8 | 0.53 |
| ILfit@10 GHz, dB | −0.41 | −0.36 | −0.35 | −0.41 | −1 | 0.59 |
| ILfit@12.5 GHz, dB | −0.48 | −0.41 | −0.4 | −0.48 | −1.25 | 0.77 |
| ILfit@15 GHz, dB | −0.57 | −0.49 | −0.47 | −0.56 | −1.5 | 0.93 |
| IMR, dB | −45.27 | −48.53 | −50.8 | −45.6 | −39 | 6.27 |
| IRL, dB | −17.23 | −17.04 | −17.6 | −17.24 | −15 | 2.04 |
| C2D, dB | −28.62 | −30.35 | −30.24 | −27.85 | −20 | 7.85 |
| D2C, dB | −28.64 | −30.28 | −30.23 | −27.87 | −20 | 7.87 |
| Tx1 | NEXT(1, 3) | NEXT(1, 7) | NEXT(2, 4) | NEXT(2, 8) | Limit | Min Margin |
| | −47.57 | −50.09 | −47.48 | −51.26 | −43 | 4.48 |

TABLE 1-continued

| The various data of the electrical connector 1 of the present invention simulated by software | | | | | | | | | | |
|---|---|---|---|---|---|---|---|---|---|---|
| Rx1 | NEXT(3, 1) | NEXT(3, 5) | NEXT(4, 2) | NEXT(4, 6) | Limit | Min Marin | | | | |
| | −47.57 | −51.82 | −47.48 | −55.1 | −43 | 4.48 | | | | |
| Tx2 | NEXT(5, 3) | NEXT(5, 7) | NEXT(6, 4) | NEXT(6, 8) | Limit | Min Margin | | | | |
| | −51.82 | −47.57 | −55.1 | −47.44 | −43 | 4.44 | | | | |
| Rx2 | NEXT(7, 1) | NEXT(7, 5) | NEXT(8, 2) | NEXT(8, 6) | Limit | Min Margin | | | | |
| | −50.09 | −47.57 | −51.26 | −47.44 | −43 | 4.44 | | | | |
| Tx1 | FEXT(1, 4) | FEXT(1, 6) | FEXT(1, 8) | FEXT(2, 3) | FEXT(2, 5) | FEXT(2, 7) | Limit | Min Margin | | |
| | −46.79 | −55.82 | −52.64 | −44.78 | −54.17 | −52.72 | −43 | 1.78 | | |
| Rx1 | FEXT(3, 2) | FEXT(3, 6) | FEXT(3, 8) | FEXT(4, 1) | FEXT(4, 5) | FEXT(4, 7) | Limit | Min Margin | | |
| | −44.78 | −54.1 | −53.82 | −46.79 | −54.03 | −56.01 | −43 | 1.78 | | |
| Tx2 | FEXT(5, 2) | FEXT(5, 4) | FEXT(5, 8) | FEXT(6, 1) | FEXT(6, 3) | FEXT(6, 7) | Limit | Min Margin | | |
| | −54.17 | −54.03 | −44.88 | −55.82 | −54.1 | −46.72 | −43 | 1.88 | | |
| Rx2 | FEXT(7, 2) | FEXT(7, 4) | FEXT(7, 6) | FEXT(8, 1) | FEXT(8, 3) | FEXT(8, 5) | Limit | Min Margin | | |
| | −52.72 | −56.01 | −46.72 | −52.64 | −53.82 | −44.88 | −43 | 1.88 | | |
| | Tx1 | Rx1 | Tx2 | Rx2 | Limit | Min Margin | | | | |
| TX/RX to D+/ D−(L)XTK, dB | −62.81 | −72.92 | −72.6 | −62.79 | −50 | 12.79 | | | | |
| TX/RX to D+/ D−(R)XTK, dB | −62.83 | −73.2 | −73.01 | −62.89 | −50 | 12.83 | | | | |
| | Tx1(L) | Tx1(R) | Rx1(L) | Rx1(R) | Tx2(L) | Tx2(R) | Rx2(L) | Rx2(R) | Limit | Min Margin |
| D+/D− to TX/RX XTK, dB | −62.7 | −62.94 | −72.98 | −73.14 | −72.74 | −72.86 | −62.73 | −62.94 | −50 | 12.7 |

USB4 Gen3 Get iPar Revision 0.91a

TABLE 2

| The actual measured data of the electrical connector of the present invention | | | | | | |
|---|---|---|---|---|---|---|
| | Tx1 | Rx1 | Tx2 | Rx2 | Limit | Min Margin |
| ILfit@2.5 GHZ, dB | −0.39 | −0.33 | −0.36 | −0.38 | −0.6 | 0.21 |
| ILfit@5 GHz, dB | −0.57 | −0.44 | −0.48 | −0.53 | −0.8 | 0.23 |
| ILfit@10 GHz, dB | −0.77 | −0.55 | −0.6 | −0.67 | −1 | 0.23 |
| ILfit@12.5 GHZ, dB | −0.87 | −0.64 | −0.7 | −0.76 | −1.25 | 0.38 |
| ILfit@15 GHz, dB | −1.01 | −0.79 | −0.85 | −0.89 | −1.5 | 0.49 |
| IMR, dB | −45.04 | −42.45 | −42.09 | −45.75 | −39 | 3.09 |
| IRL, dB | −22.69 | −20.83 | −21.14 | −23.18 | −15 | 5.83 |
| C2D, dB | −25.88 | −29.64 | −28.21 | −25.81 | −20 | 5.81 |
| D2C, dB | −25.87 | −29.64 | −28.2 | −25.78 | −20 | 5.78 |
| Tx1 | NEXT(1, 3) | NEXT(1, 7) | NEXT(2, 4) | NEXT(2, 8) | Limit | Min Margin |
| | −50.35 | −61.87 | −49.61 | −57.95 | −43 | 6.61 |
| Rx1 | NEXT(3, 1) | NEXT(3, 5) | NEXT(4, 2) | NEXT(4, 6) | Limit | Min Margin |
| | −50.35 | −57.33 | −49.61 | −57.8 | −43 | 6.61 |
| Tx2 | NEXT(5, 3) | NEXT(5, 7) | NEXT(6, 4) | NEXT(6, 8) | Limit | Min Margin |
| | −57.33 | −48.36 | −57.8 | −47.96 | −43 | 4.96 |
| Rx2 | NEXT(7, 1) | NEXT(7, 5) | NEXT(8, 2) | NEXT(8, 6) | Limit | Min Margin |
| | −61.87 | −48.36 | −57.95 | −47.96 | −43 | 4.96 |

TABLE 2-continued

The actual measured data of the electrical connector of the present invention

| Tx1 | FEXT(1, 4) | FEXT(1, 6) | FEXT(1, 8) | FEXT(2, 3) | FEXT(2, 5) | FEXT(2, 7) | Limit | Min Margin |
|---|---|---|---|---|---|---|---|---|
| | −47.98 | −61.29 | −60.65 | −49.26 | −58.33 | −61.17 | −43 | 4.98 |
| Rx1 | FEXT(3, 2) | FEXT(3, 6) | FEXT(3, 8) | FEXT(4, 1) | FEXT(4, 5) | FEXT(4, 7) | Limit | Min Margin |
| | −49.26 | −55.93 | −61.72 | −47.98 | −57.8 | −62.49 | −43 | 4.98 |
| Tx2 | FEXT(5, 2) | FEXT(5, 4) | FEXT(5, 8) | FEXT(6, 1) | FEXT(6, 3) | FEXT(6, 7) | Limit | Min Margin |
| | −58.33 | −57.8 | −47.82 | −61.29 | −55.93 | −46.11 | −43 | 3.11 |
| Rx2 | FEXT(7, 2) | FEXT(7, 4) | FEXT(7, 6) | FEXT(8, 1) | FEXT(8, 3) | FEXT(8, 5) | Limit | Min Margin |
| | −61.17 | −62.49 | −46.11 | −60.65 | −61.72 | −47.82 | −43 | 3.11 |

| | Tx1 | Rx1 | Tx2 | Rx2 | Limit | Min Margin |
|---|---|---|---|---|---|---|
| TX/RX to D+/ D−(L)XTK, dB | −59.92 | −72.34 | −70.42 | −59.91 | −50 | 9.91 |
| TX/RX to D+/ D−(R)XTK, dB | −58.72 | −72.65 | −72.76 | −58.87 | −50 | 8.27 |

| | Tx1(L) | Tx1(R) | Rx1(L) | Rx1(R) | Tx2(L) | Tx2(R) | Rx2(L) | Rx2(R) | Limit | Min Margin |
|---|---|---|---|---|---|---|---|---|---|---|
| D+/D− to TX/RX XTK, dB | −58.88 | −59.16 | −71.16 | −74.44 | −70.06 | −73.45 | −59.16 | −59.56 | −50 | 8.88 |

USB4 Gen3 Get_iPar Revision 1.1
Report Time: 26 Oct. 2022 10:37:52

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A electrical connector, comprising:

a plurality of first terminals arranged in a first terminal row, and each of the first terminals includes a first joint portion joined with a counterpart connector, a soldering portion welded to a pad of a circuit board, and a first connecting portion connecting the first joint portion and the soldering portion;

a plurality of second terminals arranged in a second terminal row parallel to the first terminal row, each of the second terminals includes a second joint portion joined with a counterpart connector, an insertion portion inserted into a through hole of the circuit board, and a second connection portion connecting the second joint portion and the insertion portion, wherein each of the first terminal row and the second terminal row includes a pair of regular signal terminals, two functional terminals respectively arranged on opposite sides of the regular signal terminal pair, two power supply terminals respectively arranged on one side of the two functional terminals, two differential terminal pairs respectively arranged on one side of the two power supply terminals and two ground terminals respectively arranged on one side of the two differential terminal pairs, electronic signal characteristics of the first terminals of the first terminal row and the second terminals of the second terminal row are arranged in opposite order to each other, and the first terminals and the second terminals are symmetrically arranged with respect to the central line of the regular signal terminal pair; and a plurality of shielding spacers arranged between the first terminal row and the second terminal row and are separated from each other by a predetermined distance for insulation, the shielding spacers include two outer shielding spacers, two inner shielding spacers and a middle shielding spacer, each of the outer shielding spacers corresponds to one of the ground terminals and a pair of differential terminal pairs, each of the inner shielding spacers corresponds to one of the functional terminals and one of the power supply terminals, and the middle shielding spacer corresponds to the regular signal terminal pair, the outer shielding spacers and the inner shielding spacers are arranged symmetrically with respect to the middle shielding spacer;

wherein the first joint portion of the ground terminal of the first terminal row and the second joint portion of the corresponding ground terminal of the second terminal row are electrically connected to opposite sides of the outer shielding spacer;

wherein the first joint portion of the power terminal of the first terminal row and the second joint portion of the corresponding power terminal of the second terminal row are electrically connected to opposite sides of the inner shielding spacer;

wherein a distance from the first joint portion of each first terminal of the first terminal row to the corresponding shielding spacer and a distance from the first connecting portion to the corresponding shielding spacer are equal, and the distance is defined as a first distance;

wherein a distance from the second joint portion of each second terminal of the second terminal row to the corresponding shielding spacer and a distance from the second connecting portion to the corresponding shielding spacer are equal, and the distance is defined as a second distance;

wherein the first distance is equal to the second distance; wherein a projection of the differential terminal of the differential terminal pairs close to the pair of power terminals does not extend further than the projection of the outer shielding spacer.

2. The electrical connector as claimed in claim 1, further comprises a first insulating positioning structure, and the shielding spacers are parallel to each other and penetrate the first insulating positioning structure and maintain a predetermined distance between each other by the first insulating positioning structure, the first insulating positioning structure has a first surface and a second surface opposite to the first surface, a distance between the first surface and the shielding spacers is equal to a distance between the second surface and the shielding spacers, the first surface of the first insulating positioning structure abuts a lower surface of the first terminals of the first terminal row, and the second surface of the first insulating positioning structure abuts an upper surface of the second terminals of the second terminal row.

3. The electrical connector as claimed in claim 1, further comprising a second insulating positioning structure, the first terminals of the first terminal row pass through the second insulating positioning structure in parallel with each other and maintain a predetermined distance between each other by the second insulating positioning structure, the second insulating positioning structure has a third surface abutting against the upper surfaces of the shielding spacers.

4. The electrical connector as claimed in claim 1, further comprising a third insulating positioning structure, the second terminals of the second terminal row pass through the third insulating positioning structure in parallel with each other and maintain a predetermined distance between each other by the third insulating positioning structure, the first of the three insulating positioning structures have a fourth surface, and the fourth surface abuts against the lower surfaces of the shielding spacers.

5. The electrical connector as claimed in claim 1, further comprising a fourth insulating positioning structure, the shielding spacers, the first terminals of the first terminal row, and the second terminals of the second terminal row respectively pass through the fourth insulating positioning structure, and the positioning structures are kept at a predetermined distance from each other by the fourth insulating positioning structure.

6. The electrical connector as claimed in claim 1, further comprising a first metal shell, wherein the first joint portion of the first terminals of the first terminal row, the second joint portion of the second terminals of the second terminal row, and portions of the shielding spacers corresponding to the first joint portions and the second joint portions are located in the first metal shell, and the first metal shell comprises a joint opening for a counterpart connector to be plugged into, a first inner surface opposite to the first joint portion and a second inner surface opposite to the second joint portion, a distance between the first joint portion and the first inner surface is equal to a distance between the second joint portion and the second inner surface.

7. The electrical connector as claimed in claim 6, further comprising a second metal shell, the soldering portion of the first terminals and the insertion portion of the second terminals are located in the second metal shell, and the second metal shell comprises a connection portion and an insertion portion, the connection portion is connected to the first metal shell and the insertion portion is inserted into the circuit board, a distance from the first connecting parts to the second metal shell is equal to a distance from the second connection portion to the circuit board.

8. The electrical connector as claimed in claim 1, wherein the counterpart connector has a third inner surface and a fourth inner surface opposite to the third inner surface, when the counterpart connector is plugged into the electrical connector, the first joint portion of the first terminals of the first terminal row correspond to the third inner surface, the second joint portion of the second terminals of the second terminal row correspond to the fourth inner surface, a distance from the first joint portion to the third inner surfaces is equal to a distance from the second joint portions to the fourth inner surface.

9. The electrical connector as claimed in claim 1, wherein the first connection portion of the ground terminals of the first terminal row has a first protrusion propping against the outer shielding spacer for electrical connection, and the second connecting portion of the ground terminal has a second protrusion propping against the outer shielding spacer for electrical connection.

* * * * *